(12) United States Patent
Richardson

(10) Patent No.: US 11,857,920 B2
(45) Date of Patent: Jan. 2, 2024

(54) CHEMICAL SEQUESTERING OF $CO_2$, $NO_x$ AND $SO_2$

(71) Applicant: Robert George Richardson, Shingleton, CA (US)

(72) Inventor: Robert George Richardson, Shingleton, CA (US)

( * ) Notice: Subject to any disclaimer, the term of this patent is extended or adjusted under 35 U.S.C. 154(b) by 0 days.

(21) Appl. No.: 17/750,331

(22) Filed: May 21, 2022

(65) Prior Publication Data

US 2022/0274049 A1    Sep. 1, 2022

Related U.S. Application Data

(62) Division of application No. 16/773,293, filed on Jan. 27, 2020, now Pat. No. 11,369,918.

(Continued)

(51) Int. Cl.
| | | |
|---|---|---|
| *B01D 53/62* | (2006.01) | |
| *B01D 53/14* | (2006.01) | |
| *B01D 53/50* | (2006.01) | |
| *B01D 53/56* | (2006.01) | |
| *B01D 53/60* | (2006.01) | |

(Continued)

(52) U.S. Cl.
CPC ......... *B01D 53/60* (2013.01); *B01D 19/0005* (2013.01); *B01D 53/1406* (2013.01); *B01D 53/1425* (2013.01); *B01D 53/1475* (2013.01); *B01D 53/1481* (2013.01); *B01D 53/1493* (2013.01); *B01D 53/502* (2013.01); *B01D 53/56* (2013.01); *B01D 53/62* (2013.01); *B01D 53/73* (2013.01); *B01D 53/76* (2013.01); *B01D 53/78* (2013.01); *B01D 53/96* (2013.01); *C01D 5/02* (2013.01); *C01D 7/07* (2013.01); *C01D 7/12* (2013.01); *C01D 9/06* (2013.01); *C01D 13/00* (2013.01); *C25B 1/34* (2013.01); *B01D 2251/302* (2013.01); *B01D 2251/304* (2013.01); *B01D 2251/306* (2013.01); *B01D 2251/604* (2013.01); *B01D 2252/103* (2013.01); *B01D 2252/205* (2013.01); *B01D 2252/2021* (2013.01); *B01D 2252/504* (2013.01);

(Continued)

(58) Field of Classification Search
None
See application file for complete search history.

(56) References Cited

U.S. PATENT DOCUMENTS

| | | | |
|---|---|---|---|
| 2016/0265085 A1* | 9/2016 | Bourassa | B01D 61/422 |
| 2022/0096997 A1* | 3/2022 | Richardson | C01D 5/02 |

* cited by examiner

*Primary Examiner* — Daniel Berns
(74) *Attorney, Agent, or Firm* — Edward D. Robinson

(57) ABSTRACT

The disclosure provides seven integrated methods for the chemical sequestration of carbon dioxide ($CO_2$), nitric oxide (NO), nitrogen dioxide ($NO_2$) (collectively $NO_x$, where x=1, 2) and sulfur dioxide ($SO_2$) using closed loop technology. The methods recycle process reagents and mass balance consumable reagents that can be made using electrochemical separation of sodium chloride (NaCl) or potassium chloride (KCl). The technology applies to marine and terrestrial exhaust gas sources for $CO_2$, NOx and $SO_2$. The integrated technology combines compatible and green processes that capture and/or convert $CO_2$, NOx and $SO_2$ into compounds that enhance the environment, many with commercial value.

10 Claims, 10 Drawing Sheets

Related U.S. Application Data

(60) Provisional application No. 62/803,564, filed on Feb. 10, 2019, provisional application No. 62/797,468, filed on Jan. 28, 2019.

(51) Int. Cl.

| | | |
|---|---|---|
| | *B01D 53/73* | (2006.01) |
| | *B01D 53/76* | (2006.01) |
| | *B01D 53/78* | (2006.01) |
| | *B01D 53/96* | (2006.01) |
| | *C01D 5/02* | (2006.01) |
| | *C01D 7/07* | (2006.01) |
| | *C01D 7/10* | (2006.01) |
| | *C01D 7/12* | (2006.01) |
| | *C01D 9/06* | (2006.01) |
| | *C25B 1/34* | (2006.01) |
| | *B01D 19/00* | (2006.01) |
| | *C01D 13/00* | (2006.01) |

(52) U.S. Cl.
CPC .. *B01D 2257/302* (2013.01); *B01D 2257/404* (2013.01); *B01D 2257/504* (2013.01)

CHEMICAL SEQUESTERING OF $CO_2$, $NO_x$ AND $SO_2$

CROSS REFERENCE TO RELATED APPLICATIONS

This application is a divisional application of U.S. patent application Ser. No. 16/773,293, titled "CHEMICAL SEQUESTERING OF $CO_2$, $NO_x$ and $SO_2$", filed Jan. 27, 2020, which claims the benefit of priority under 37 U.S.C. § 119(e) to U.S. Provisional Patent Application No. 62/797,468, titled "CHEMICAL SEQUESTERING OF $CO_2$ USING CLOSED LITHIUM TECHNOLOGY," filed on Jan. 28, 2019, and to U.S. Patent Provisional Patent Application No. 62/803,564, titled "CHEMICAL SEQUESTERING OF REACTION PRODUCTS FROM GAS PHASE ABATEMENT," filed on Feb. 10, 2019 the entire disclosures of which are hereby incorporated by reference in their entireties for all purposes."

TECHNICAL FIELD OF THE INVENTION

The present disclosure generally relates to sequestering of atmospheric gases, and more particularly, to the chemical sequestration of carbon dioxide ($CO_2$), nitric oxide (NO), nitrogen dioxide ($NO_2$) [collectively "$NO_x$" where x=1 or 2], and sulfur dioxide ($SO_2$) using closed loop technology.

BACKGROUND OF THE INVENTION

Atmospheric gases such as $CO_2$, $NO_x$ and $SO_2$ are internationally recognized as being toxic and may cause dangerous global warming. There have been and continue to be many technologies focused on the reduction in the production and sequestering of these gases. The chemical characteristics of these gases, however, contribute to the difficulty in the development of a low-cost sequestering technology. These gases are stable entities, which require either large amounts of expensive chemical or mechanical energy to entice them into a chemical reaction.

Scientific research has confirmed greenhouse gas accumulation in the atmosphere and ocean is causing a dramatic change to the life supporting environment on earth. Most governments around the world recognize this and are taking steps to reverse the trend and mitigate the damage. Events that occurred during 23 Sep. 2019 are examples of this commitment. The following resolutions and commitments were made at the United Nations Climate Change Summit:

The European Union announced at least 25% of the next EU budget will be devoted to climate-related activities.

France announced that it would not enter into any trade agreement with countries that have policies counter to the Paris Agreement.

Germany and 65 other countries committed to carbon neutrality by 2050.

12 countries made financial commitments to the Green Climate Fund, the official financial mechanism to assist developing countries in adaptation and mitigation practices to counter climate change. This includes Norway, Germany, France and the United Kingdom's recent doubling of their previous contributions.

The United Kingdom made a major additional contribution, doubling its overall international climate finance to L11.6 billion for the period from 2020 to 2025.

India pledged to increase renewable energy capacity to 175 GW by 2022 and then continue increasing its capacity to 450 GW.

80 countries have joined the International Solar Alliance.

China said it would cut emissions by over 12 billion tons annually and would pursue a path of high-quality growth and low carbon development.

The Russian Federation announced that they will ratify the Paris Agreement, bringing the total number of countries that have joined the Agreement to 187.

Pakistan said it would plant more than 10 billion trees over the next five years.

The United Nations Intergovernmental Panel on Climate Change issued a 1170-page report that documents effects of climate change that confirms the climate emergency on 23 September.

A third meeting held in London also culminated on 23 September that is directly relevant to the marine shipping industry. Leading ports, banks, oil and shipping companies met on Monday 23 September and launched an initiative which aims to have ships and marine fuels with zero carbon emissions on the high seas by 2030. This is another step by the maritime sector to reduce $CO_2$.

Sixty commercial groups including shipping companies such as A. P. Moller Maersk (MAERSKb.CO), which owns the world's biggest container shipping line, commodities players such as COFCO International, Cargill, Trafigura, mining group Anglo American (AAL.L) as well as banks such as Citigroup (C.N), ABN AMRO (ABNd.AS) and Societe Generale (SOGN.PA) have committed to the "Getting to Zero Coalition." The coalition is pushing for vessels and fuels to be ready by 2030 and supported by the required infrastructure.

While there has been progress in the reduction of the generation of these gases, there has been limited success in capturing these gases once released into the atmosphere. Therefore, there remains a need in the art for new methods and technologies to effectively and economically sequester atmospheric gases such as $CO_2$, $NO_x$ and $SO_2$.

SUMMARY OF THE INVENTION

The disclosed methods provide for technologies that effectively sequester gases such as $CO_2$, $NO_x$ and $SO_2$ (Target Gases) with high removal efficiency from point source gas streams or the atmosphere, and then convert them into commercially viable products like sodium bicarbonate ($NaHCO_3$), a compound that can protect the oceans from $CO_2$ acidification, and sodium nitrate ($NaNO_3$), a fertilizer, in an energy efficient way with net zero carbon footprints for all of these gases.

The disclosed processes recycle its intermediate reagents in an energy efficient way using forced alcohol precipitation. The alcohols remove salts made from $CO_2$, NOx & $SO_2$ that are repurposed from the methodologies' process liquid at pre-determined points to avoid unwanted equipment clogging. The alcohol(s) selected for this methodology have the unique ability to be recycled through evaporation at 70° C. with waste heat from combustion or recaptured through solidification at temperatures below 25° C., available from seawater for example.

The disclosure describes a combination of seven strategically selected primary processes that are synergistically paired in two different cyclic process groups. The groups are identified as the 1-Loop Process and the 2-Loop Process. Both process loops are linked through a novel integrated sensor and control logic. This combination of processes and control technology encompasses several novel $CO_2$, NOx or $SO_2$ sequestration and reuse method features.

All seven of the primary $CO_2$, NOx and $SO_2$ repurposing reactions were strategically chosen to work collaboratively and thereby minimize reactant usage. There are several examples where the byproducts of one reaction are used as a reactant in another reaction.

This methodology uniquely solves a space problem associated with applications that have limited space for example the treatment of exhaust gases from marine vessels. This is done in two ways: First, there is no need to store process reagents aboard the ship. The seven strategically chosen main processes in this methodology also have the novel ability to supply their primary consumable reagents from the electrochemical (or membrane) treatment of seawater. Second, the integrated processes minimize the need for reaction chamber size and thereby make the technology equipment size compatible with the limited space available on marine vessels or in congested terrestrial industrial facilities.

The process combination is novel because all of the reactions are rate determined by the consumption of either sodium hydroxide (NaOH) or sodium hypochlorite (NaOCl).

At least one $CO_2$ treatment process and one NOx treatment process are rate controlled by the dosing of NaOH and at least one process in each group is rate controlled by the concentration of sodium hypochlorite (NaOCl) as a reactant. This feature allows the process control system to regulate the rate of each of the seven primary processes in a way that balances the use of chemistry that can be supplied from an electrochemical treatment of sodium chloride (NaCl).

A second feature of the novel process control logic is its ability to utilize pre and post treatment gas concentrations for the $CO_2$, NOx and $SO_2$ and other variables to proactively and reactively adjust the rates of individual reactions by selectively supplying only the as needed amounts of reactants required to treat the concentration of $CO_2$, NOx or $SO_2$ in the gas stream. This "as required" chemical dosing feature minimizes the overall chemical use by eliminating any wasted chemicals. The novel process control also selects which of the seven processes are favored in the overall treatment of gaseous $CO_2$, NOx and $SO_2$.

A third feature is available because the seven processes are strategically selected with at least one $CO_2$ treatment process and one NOx treatment processes utilizing NaOH as its reaction controlling reagent and at least one other process in each group using NaOCl as the reaction controlling reagent. This strategic selection of primary process allows the integrated process control logic to balance the overall consumption of NaOH and NaOCl by responding to sensor data and then preferentially prioritizing either the NaOH or NaOCl processes for $CO_2$ treatment and/or NOx treatment as required to balance the overall chemical production from the electrochemical generator.

A fourth feature of the integrated combination of processes and process control system is its ability to treat the gaseous $CO_2$, NOx and $SO_2$ using mist or gas phase reactions within ducting that can be oriented in any direction. This feature results in a small physical size when compared to conventional treatment methodologies for these gases. Large reaction chambers can be used but are not required. The small equipment size allows this integrated gas treatment technology to be used in small space requirements of marine vessels and congested industrial facilities where conventional gas treatment process will not fit.

A fifth feature of this strategically selected group of seven processes and novel process control technology is the ability to individually adjust the reaction rates of all of the processes as required to compensate for variations in the $CO_2$, NOx and $SO_2$ compound ratio and overall concentrations of the compounds in exhaust gas in real time.

The previously described $CO_2$ repurposing process utilized NaOH to regenerate lithium hydroxide (LiOH). The process has a high $CO_2$ removal efficiency and effectively cooperates with other $CO_2$ capture and repurposes technologies that utilize sodium hypochlorite (NaOCl) as the consumable reagents. The use of two compounds that can be made from NaCl provides a clever method for balancing the consumable reagent requirement as previously described. This is an attribute when this methodology is used on a marine vessel or other application that benefits from onsite manufacturing of consumable reagents with electrochemical conversion of NaCl from seawater or brine.

This patent also describes an additional methodology for $CO_2$ capture and repurposes technology. The consumable reagent in this lithium hydroxide based $CO_2$ capture process is potassium hydroxide (KOH). The KOH is used to regenerate the LiOH. This process does not provide an ability to balance reactants made on site by electrochemical processes, but it does have smaller piping systems than the LiOH based $CO_2$ capture system using NaOH as its consumable reagent. This equipment sizing difference is the result of increased secondary step reactant solubility in the KOH based $CO_2$ capture technology.

Irrespective of the reagent used to recycle LiOH in the $CO_2$ capture technology, it provides 99.0% $CO_2$ removal efficiency and produces sodium bicarbonate ($NaHCO_3$), a compound that dramatically benefits ocean stability. However the process is compromised by NOx in the gas stream and slowed by the presence of large amounts of $SO_2$. That is why the LiOH based $CO_2$ capture process is included in the group of processes previously described that treat NOx, $SO_2$ and $CO_2$. The group also provides the ability to balance the NaOH and NaOCl consumption.

The LiOH based $CO_2$ capture process utilizing KOH as its consumable reagent, also requires a gas or liquid stream with minimal levels of $SO_2$ and NOx, but must, because of chemical compatibility, use a method other than that shown above to accomplish this objective. An unrelated process is ideal for this application. It utilizes non-ionic chlorine dioxide ($ClO_2^\circ$) to remove 99.5% of NOx and SOx from a gas or liquid stream.

BRIEF DESCRIPTION OF THE DRAWINGS

The disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
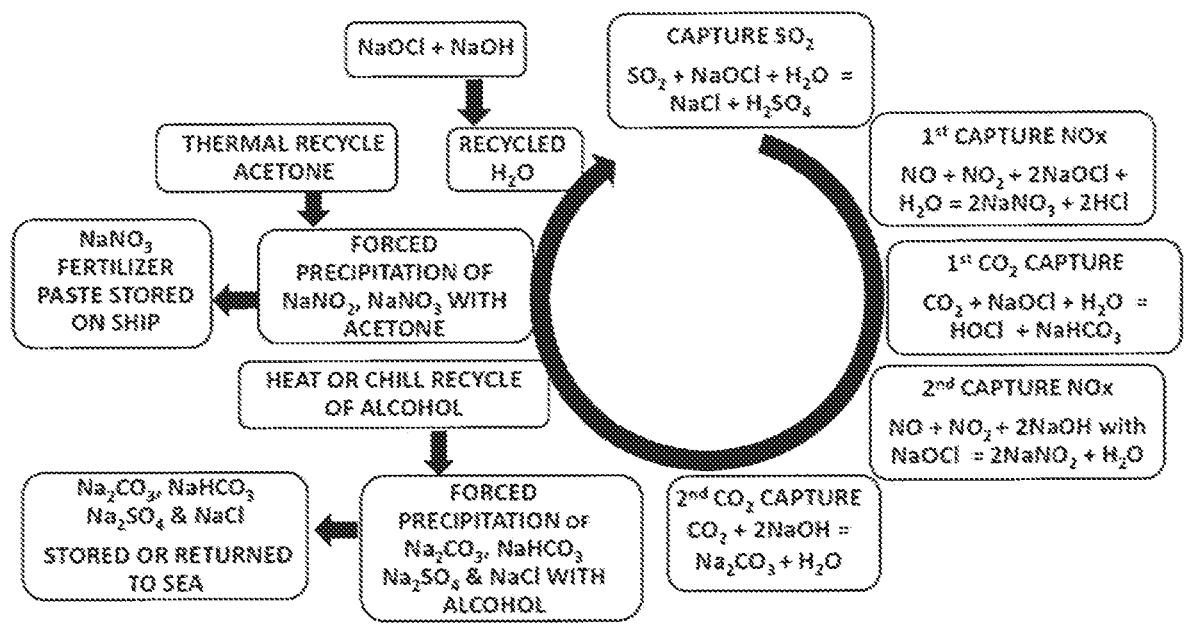
FIG. 1 illustrates an embodiment of an integrated closed loop system (1-Loop Process), which collaboratively captures $CO_2$, $NO_x$ and $SO_2$.

The following description is presented to enable a person of ordinary skill in the art to make and use embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the disclosure is not intended to be limited to the examples described herein and shown but is to be accorded the scope consistent with the claims.

The word "exemplary" is used herein to mean "serving as an example illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

The specific order or hierarchy of steps in the process disclosed herein is an example of exemplary approaches. Based upon design preferences, it is understood that the specific order or hierarchy of steps in the processes can be rearranged while remaining within the scope of the disclosure. Any accompanying method claims present elements of the various steps in a sample order and are not meant to be limited to the specific order or hierarchy presented.

The disclosed technology presented herein is relevant to the objectives and tasks of the above groups that are focused on enhanced environmental stewardship. The technology provides a new resource for terrestrial and sea applications for $CO_2$ capture and repurposing $NO_x$ abatement and $SO_2$ destruction. For example, the byproduct of the $CO_2$ capture processes described herein is sodium bicarbonate ($NaHCO_3$), which is the compound the oceans use to maintain the chemical equilibrium necessary for life. If this product is shared with the sea, it will reverse the acidification that $CO_2$ is causing when it unavoidably transfers from the atmosphere into oceans and other bodies of water.

The disclosed technology can be applied to marine and terrestrial exhaust gas sources for $CO_2$, NOx and $SO_2$ or directly treat these compounds in the atmosphere. This integrated technology provides a combination of compatible and very green processes that capture and/or convert these gases into compounds that enhance the environment, many with commercial value.

The disclosed combination of chemical processes using NaOH and NaOCl as consumable reactants has been verified through bench scale testing, to remove 99% $CO_2$, 90% $NO_x$ and 99% $SO_2$ from combustion and chemical process exhaust gas. The $ClO_2^{\circ}$ based NOx removal technology has a 99.5% removal efficiency. The results are based on testing of gas streams including but are not limited to diesel exhaust, heavy fuel oil combustion exhaust and exhaust from chemical digestion processes.

The disclosed technology applies to terrestrial and ocean vessel applications. It also requires a small physical "footprint" and is carbon neutral when treating exhaust generated from the production of electricity the processes use. The technology is also carbon neutral when it uses electricity generated from solar or wind sources. All of the target gases are removed in a continuous mist, dry/wet aerosol, gas phase or liquid phase reaction(s) within vessels that can be not much larger in diameter than conventional duct for a given exhaust gas flow.

The combined $CO_2$, NOx and $SO_2$ abatement processes are collaborative. Chemical use is minimized because reaction products from one process are often reagents in another. For example, in the reaction sequence shown in FIG. 1, the HOCl formed in the first capture of $CO_2$ is used to generate NaOCl in the two subsequent capture process of NOR.

The primary consumable for all of these processes is sodium chloride (NaCl) or potassium chloride (KCl). The energy required to convert NaCl or KCl into other consumables used in the processes is included in the mass balance and energy study shown below.

Most of the chemicals used in the $CO_2$, NOx and $SO_2$ capturing and repurposing processes can be recycled. The entire reagent recycling only requires 70° C. that can be supplied from combustion waste heat or chilling to below 25° C. that can be supplied by seawater or other liquid of equal or lesser temperature.

The electrical power required for equipment operation is also included in the provided energy study and mass balance. This process can treat the $CO_2$, NOx and $SO_2$ made from generating the electricity required for this process if the generation source is local, for example a ship or power plant application.

The process control system logic program used to collaboratively manage processes described herein has the ability to individually adjust the reaction rates of all of the processes independently as required to compensate for variations in the $CO_2$, NOx and $SO_2$ compound ratio and overall concentrations of the compounds in exhaust gas in real time. This is done by sensing the concentration of $CO_2$, NOx and/or $SO_2$ and then dosing only the requisite amount of reagent necessary to treat the desired amount of $CO_2$, NOx or $SO_2$.

The disclosed methods provide for technologies that effectively sequester point source and atmospheric gases including $CO_2$, $NO_x$ and $SO_2$. The technology can be applied at the point source for these gases, for example, from the exhaust stack of a combustion source, or a chemical reaction that generates these gases. These gases may also be present in the liquid phase, such as when they are dissolved into an aqueous solution. This technology is also applicable for gases that have been released into the atmosphere or are present in water. This technology is also environmentally responsible because it generates non-hazardous reaction byproducts such as sodium bicarbonate ($NaHCO_3$), which is also known as baking soda and has commercial value.

The disclosure provides seven synergistically related chemical processes for the removal of $CO_2$, NOx and $SO_2$ (target gases). The disclosure also describes the supporting reactions and reveals the useful aspects of the integrated chemical process methodology. The seven chemical processes and their supporting reactions share multifaceted chemical synergy that results in reduced reaction chamber volume, decreased residence time, compounds recycled with low energy and efficient production of commercially viable products. For example, the five chemical reactions described in FIG. 1 can occur in a single reaction chamber. The rate of reactions for all five reactions can be individually regulated by varying the concentrations and pH of solutions that contain only three chemicals. The products of some reactions are also the reactants for subsequent reactions.

The process control techniques can use data from strategically placed sensors with data that is confirmed accurate through comparisons between sensors with known chemical axioms, the Process Logic Control (PLC) program employs sophisticated "if then" logic and algorithms that adroitly regulate the reaction rates of all reactions in a way that:

Adjusts for changes in the ratios of the three target compounds.

Adjusts for changes in concentrations of the target compounds.

Determines as needed chemical dosing necessary to individually obtain a predetermined $CO_2$ and NOx and $SO_2$ removal efficiency. This approach eliminates excess chemical use.

Balances the molar ratios of the two primary reactants: NaOH and $Cl_2$/NaOCl for all seven reactions.

The multi-variable if then logic of the PLC can accomplish these tasks because the seven principal reactions to treat the target compounds were deliberately chosen with $CO_2$ and —$NO_x$ reactions that use NaOH/NaOCl as their primary rate determining reagent. This ability to treat $CO_2$ or NOx or $SO_2$ with either group of compounds allows the PLC program to adjust the reaction rates of the seven equations as required to balance the chemical demand for NaOH and NaOCl. The entire group of seven processes can also act as a "polishing scrubber" that follows a less efficient $CO_2$, NOx, $SO_2$ or other scrubber for another compound(s) where desired.

The emphasis on balanced reagent usage is important because it allows a single electrochemical (E-Chem) process to generate the two major reagents for all seven processes described in this document through the conversion of NaCl into NaOH and $Cl_2$. The $Cl_2$ is immediately converted to NaOCl and HOCl using a conventional subordinate reaction that requires a portion of the NaOH generated by the E-Chem process. This step of selecting 7 equations that have chemically symbiotic stoichiometry and easily managed reaction mechanics is commercially valuable because it eliminates or reduces the need for reagent storage containers. This feature is of significance when the integrated process is used aboard a vessel that chooses to generate its reactants from seawater using an electrochemical process rather than utilize ship cargo space for chemical reagents. The electrochemical process can also be used with sodium chloride brine aboard a vessel or in terrestrial applications.

There is a very important justification for returning the $NaHCO_3$ to the sea, it compensates for $CO_2$ adsorbed by the sea from the atmosphere. The sea utilizes $NaHCO_3$ as its primary buffering compound to hold the ocean pH stable at approximately 8.1. The $CO_2$ enters the sea from the atmosphere as part of a natural effort to equalize the concentrations of $CO_2$ within the gas phase atmosphere and liquid phase ocean water. At this time, the world's oceans are using more $NaHCO_3$ to compensate for the adsorbed $CO_2$ than they can make through dissolving of $CaCO_3$ from shells and other materials within the sea. If this process is not balanced in some way, the oceans will lose their ability to maintain their pH. The resulting rapid change in pH will kill the algae that produce approximately 70% of the world's oxygen introduced into the atmosphere. If that happens, humans and everything else that relies on oxygen in the atmosphere will die! That would cause the world's $6^{th}$ extinction process. Unfortunately, there is already so much $CO_2$ in the atmosphere from natural and anthropomorphic sources that even if we immediately stopped introducing more $CO_2$ into the atmosphere from combustion and other sources, the worlds' oceans will run out of available $NaHCO_3$ before the equilibrium between $CO_2$ in the atmosphere and oceans is reached.

Therefore, intervention is required to prevent an ocean pH catastrophe. Fortunately, the $CO_2$ capture processes disclosed herein creates one mole of $NaHCO_3$ byproduct for every mole of $CO_2$ that it sequesters from any source. The processes disclosed herein are part of the solution to prevent the oceans from losing their ability to maintain the life-saving pH equilibrium.

Thus, in one embodiment, the disclosure provides technology that combines processes for the removal of $CO_2$, NOx and $SO_2$ from an exhaust gas or liquid stream using three or more sequential reaction stages within a single reactor or combination of three or more separate reaction stages. The gas/mist or gas/(wet or dry aerosol) or liquid/liquid phase reaction technology allows individual and collective scrubbing stages to treat any gas/liquid volume from less than 500 $m^3$/minute to any size that can be built. The reaction rates can be fast enough to facilitate reaction vessel sizing that is small enough for mobile applications as well as terrestrial applications with limited space. The methodology can also be made much larger to accommodate an exceptional target gas treatment requirement. Although not commercially offered for sale or sold, the methodology has been successfully sized for a challenging marine vessel application where space is limited. The mass balance for this exercise is included in this document. The process can easily be sized for a much larger terrestrial applications.

As shown in FIG. 1, 1-Loop Process technology involves the initial capture of $SO_2$. This process can occur when gas containing $SO_2$ is introduced into an aqueous mist containing sodium hypochlorite (NaOCl or NaClO, also known as "bleach") or moving gas containing $SO_2$ through a counter-current packed bed scrubber, bubble tray scrubber or equal that is recirculating a solution that contains NaOCl or by reacting a solution that contains $SO_2$ with a solution that contains NaOCl. In all cases the reaction forms sodium chloride (NaCl) and sulfuric acid ($H_2SO_4$). As shown below in equation [1], 1 mole of NaOCl can react with 1 mole of $SO_2$ and 1 mole of $H_2O$ to form 1 mole of NaCl and 1 mole of $H_2SO_4$:

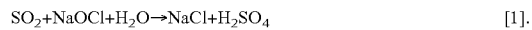
$$SO_2+NaOCl+H_2O \rightarrow NaCl+H_2SO_4 \quad [1].$$

Next, as shown in FIG. 1, the first capture of $NO_x$ (both NO and $NO_2$) can occur through their reaction with NaOCl and $H_2O$ to form sodium nitrate ($NaNO_3$) and hydrochloric acid (HCl). As shown in equation [2], 1 mole of NO and 1 mole of $NO_2$ can react with 2 moles of NaOCl and 1 mole of $H_2O$ to form 2 moles of $NaNO_3$ and 2 moles HCl:

$$NO+NO_2+2NaOCl+H_2O \rightarrow 2NaNO_3+2HCl \quad [2].$$

Next, as shown in FIG. 1, the first capture of $CO_2$ can occur through its reaction with NaOCl and $H_2O$ to form hypochlorous acid (HOCl) and $NaHCO_3$. As shown in equation [3], 1 mole of $CO_2$ can react with 1 mole of NaOCl and 1 mole of $H_2O$ to form 1 mole of HOCl and 1 mole of $NaHCO_3$:

$$CO_2+NaOCl+H_2O \rightarrow HOCl+NaHCO_3 \quad [3].$$

Next, as shown in FIG. 1, the second capture of $NO_x$ can occur through their reaction with NaOH and NaOCl to form sodium nitrite ($NaNO_2$) and $H_2O$. As shown in equation [4], 1 mole of NO and 1 mole of $NO_2$ can react with 2 moles of NaOH and 1 mole of NaOCl to form 2 moles $NaNO_2$, 1 mole of NaCl and 1 mole of $H_2O$:

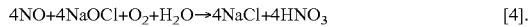

$$4NO+4NaOCl+O_2+H_2O \rightarrow 4NaCl+4HNO_3 \quad [4].$$

Finally, as shown in FIG. 1, the second capture of $CO_2$ can occur through its reaction with NaOH to form $NaHCO_3$. As shown in equation [5], 1 mole of $CO_2$ can react with 1 mole of NaOH to form 1 mole of $NaHCO_3$:

$$CO_2+NaOH \rightarrow NaHCO_3 \quad [5].$$

The first forced precipitation of the products can occur upon addition of an alcohol including but not limited to methanol, ethanol, propanol, butanol including tert-butanol, and the like, or a ketone including but not limited to acetone to the reaction mixture containing products $NaHCO_3$, $Na_2SO_4$ and NaCl. Once the precipitated material has been separated from the aqueous/alcohol phase, the alcohol (methanol) can be thermally separated and recycled and the solid $NaHCO_3$, $Na_2SO_4$ and NaCl products can be stored for commercial use or returned to the sea. Alternatively, once precipitated material is removed from the aqueous/alcohol liquor, the alcohol (tert-butanol) can be separated from the aqueous phase and recycled by chilling the mixture with seawater or other cold trap of 25° C. or lower temperature plus separation of the jell or solid by any appropriate means. The solid $NaHCO_3$, $Na_2SO_4$ and NaCl products can be stored for commercial use or returned to the sea.

The second forced precipitation of the products can occur upon addition of a dialkyl ketone, including but not limited to acetone, methyl ethyl ketone, diethyl ketone and the like, to the aqueous reaction mixture containing $NaNO_2$, $NaNO_3$. Once precipitated material is separated from the aqueous/acetone mixture, the acetone can be thermally recycled and the solid $NaNO_3$ product can be stored for use as fertilizer.

In addition, as shown in FIG. 1, NaOCl and NaOH and any recycled $H_2O$ can be added back into the loop sequence to maintain the reaction cycle.

The reaction sequence shown in FIG. 1 uses a process control sequence based on multiple algorithms that effectively regulate the interrelated reaction rates of five slightly overlapping sequential reactions by varying reagent dosing parameters. The process control can integrate data from multiple sensors using multi-variable simultaneous equations that employ if-then logic and references known kinetic reaction parameters to determine the validity of the sensor data. This process control also regulates reagent injection timing into the single reaction chamber. The process control also involves regulation of the mass of reagents injected and pH of the reagent mixtures used. This multivariable process control of five reactions can be accomplished by the regulation of just three reactants: NaOCl, NaOH and HCl.

The synergistic choice of reactions within the loop sequence allows the reaction products in early stages of the process to act as reagents in subsequent reactions that occur in semi-overlapping environments within the same vessel. For example, in the reaction sequence shown in FIG. 1, the HOCl formed in the first capture of $CO_2$ is used to generate NaOCl in the two subsequent capture process of NOR.

Precise process control is possible for the reactions shown in FIG. 1 because the unique and different reactions chosen for the process have uniquely different kinetic reaction rates and respond differently to the two ions formed when $NaHCO_3$ is speciated in response to the pH of its environment.

Knowledge of reaction sequence and deliberately varying the pH, timing and amount of the NaOCl reagent dosed into the reaction chamber as described previously provides a predictable way to selectively capture and/or remove $SO_2$, NOx and $CO_2$ in the process sequence.

The fifth reaction in the FIG. 1 loop utilizes NaOH as its reagent. The rate and timing of the introduction of NaOH as specified by the PLC program in response to pre-determined sensor data regulates that process too.

The process control logic used in this system requires reliable data from sensors. Non-specific sensors like Oxidation Reduction Potential (ORP) can provide unreliable process information. For example, if ORP is used to regulate the dosing of NaOCl into a reaction mixture, a change in ORP would accompany the addition of NaOCl, and that would be a valid process control variable if NaOCl was the only compound that could influence the solution ORP value. But data from an ORP probe can be unreliable because ORP is not exclusively sensing the HClO and ClO$^-$ ions in the reaction mixture. Other chemical compounds or ions in the reaction mixture can also influence the ORP value of the reaction liquid. This problem is not resolved by utilizing two or more of the same sensors. Therefore, the process control logic used for the regulation of the reactions disclosed herein does not rely on non-specific sensors where process confusion is possible. The process control described in this patent application relies on comparison between information from two uniquely different sensors in each situation where process sensor confusion is possible.

Figure 2:
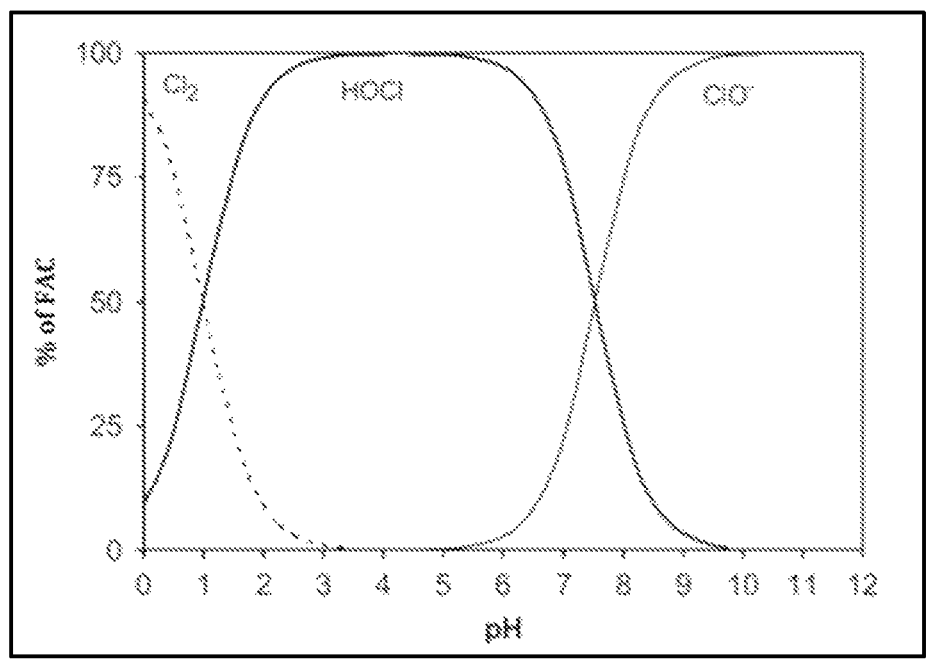
FIG. 2 illustrates an embodiment of the NaOCl/NaOCl percent speciation at different pH environments in an integrated closed loop system (1-Loop Process)

For example, the dosing of NaOCl can be confirmed by data from two dissimilar sensors: the pH of process liquid and the concentration of $Cl_2$ gas in the reaction chamber. The two sensor values are compared against known speciation of NaOCl as shown in FIG. 2. The combination just described is used to provide reliable process variable data for each area where the addition of NaOCl is a part of process chemistry.

The concept of verifying sensor data applies to other process variables too. The FTIR data for the identity and concentrations of gases in specific sections of the reaction chamber can be compared with known relationships between gas ratios such as the presence of $SO_2$ against the pH of the process liquid mist.

The monitored and regulated integration of multiple processes within a single reactor is the primary reason the reaction chambers are much smaller than would be required if the seven processes were completed in separate reaction chambers and regulated with conventional process control.

The alternative methodology for removing $SO_2$ and NOx from a gas or liquid stream prior to LiOH based $CO_2$ capture is based on chlorine dioxide ($ClO_2°$).

The key to this process is generating non-ionic chlorine dioxide distinguished with a superscripted "°" as shown here: $ClO_2°$. This can be done by several methods that are described in the previously referenced patent. Process control that meters the $ClO_2°$ addition into a reaction chamber(s) as required to react with known quantities of nitrogen monoxide (NO) and nitrogen dioxide ($NO_2$) provided by FTIR or other sensors capable of sensing these compounds and $ClO_2°$ in a gas or liquid stream. The $ClO_2°$ reacts with the NO and NO2 according to equations [6] and [7]:

$$5NO+2(ClO_2)°+H_2O \rightarrow 5NO_2+2HCl \quad [6]$$

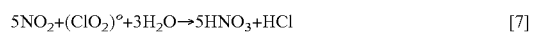

$$5NO_2+(ClO_2)°+3H_2O \rightarrow 5HNO_3+HCl \quad [7]$$

The HCl and HNO₃ generated by equations [6] and [7] are neutralized with KOH as described in equations [8] and [9]:

$$HCl + KOH \rightarrow KCl + H_2O \quad [8]$$

$$HNO_3 + KOH \rightarrow KNO_3 + H_2O \quad [9]$$

The KCl and KNO₃ products shown in equations [8] and [9] can be removed with forced precipitation using ethanol or equal.

In another embodiment, the disclosure provides 2-Loop Process technology of an integrated closed two loop system, which collaboratively captures CO₂ and converts it to NaHCO₃. During this sequence, the primary reactants include lithium hydroxide (LiOH), which can be regenerated and recycled back into the loop. The rate controlling consumable that is introduced into the loop includes sodium hydroxide (NaOH). A by-product, sodium carbonate (Na₂CO₃) can be generated, and can be used for further conversion of CO₂ into NaHCO₃. This technology has many applications including use in space crafts, ships, submarines, and anesthesia.

Figure 3A:
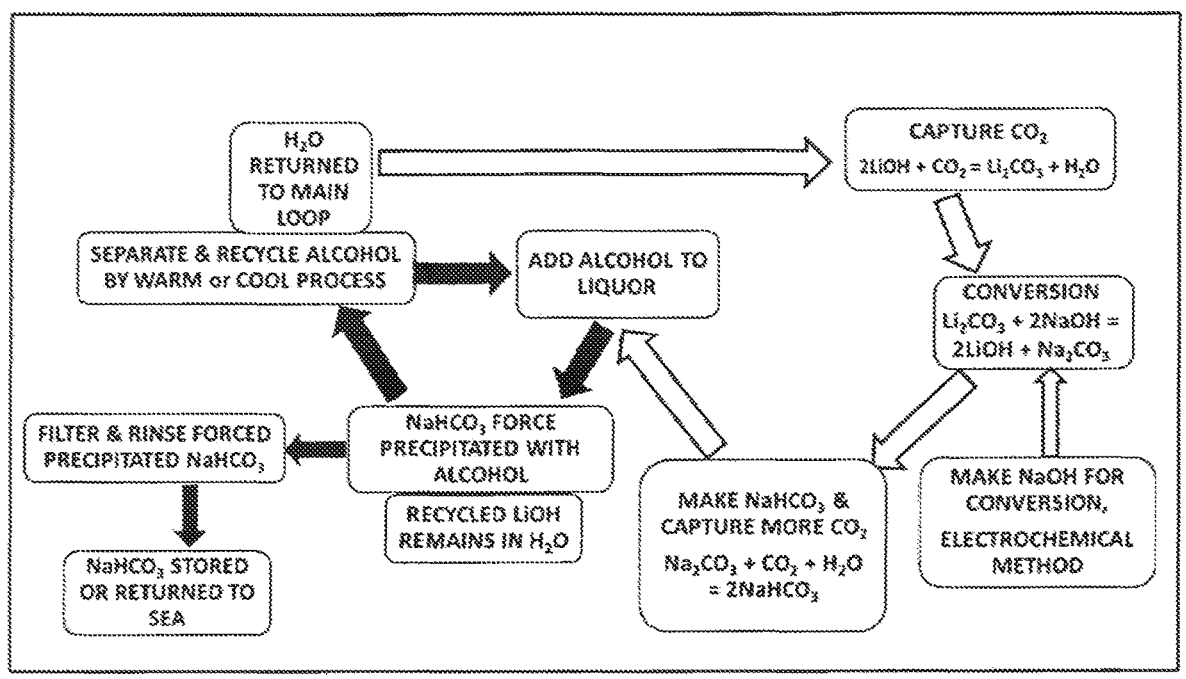
FIGS. 3A and 3B illustrate other embodiments of an integrated closed loop system (2-Loop Process), which collaboratively captures $CO_2$.
Figure 3B:
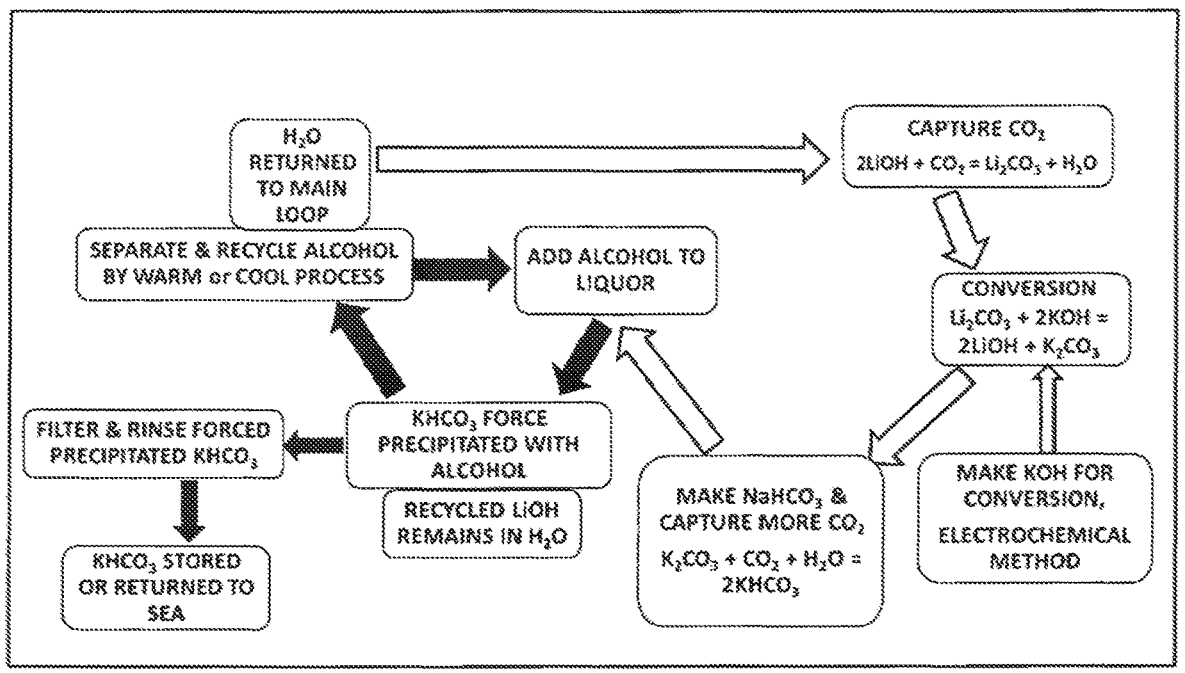

As shown in FIGS. 3A and 3B, Loop 1 of the 2-Loop Process involves the initial capture of CO₂ and a second capture of CO₂. This process occurs when CO₂ is introduced to lithium hydroxide (LiOH) or sodium carbonate (Na₂CO₃). The contact and subsequent reaction between LiOH and/or Na₂CO₃ and CO₂ can occur in several ways: gas containing CO₂ can be exposed to an aqueous mist containing LiOH and/or Na₂CO₃ resulting in the CO₂ transfer through the membrane between the gas phase and the liquid droplet where it reacts with the LiOH and/or Na₂CO₃ in the droplet. Gas containing CO₂ can impact a thin liquid film containing LiOH resulting in the CO₂ transfer through the membrane between the gas phase and the liquid film where reacts with the LiOH and/or Na₂CO₃ in the liquid film.

In another example CO₂ can be dissolved or suspended in an aqueous solution which is mixed with a solution containing dissolved LiOH and/or Na₂CO₃ where it subsequently reacts with the LiOH and/or Na₂CO₃. In a final example, a gas containing CO₂ can be exposed to an aerosol conveying dry or moist LiOH granules or nano-granules that contact gas phase CO₂ or CO₂ dissolved/suspended in liquid droplets resulting in a reaction as described in equations [10A and 10B]. The reaction product and excess reactants are subsequently captured in a mist or liquid that is ultimately recirculated in this process sequence.

This capture of CO₂ used in this methodology as described above is uniquely different from the well-known and industry practiced "dry" method that captures CO₂ by exposing the gas to stationary beds of granular LiOH or granular material impregnated with LiOH or other lithium materials.

All of the examples of CO₂ capture used in this methodology, described on FIG. 3A, ultimately transfer the CO₂ into an aqueous phase where it reacts according to the equations as shown below.

As shown below in equation [10A], 2 moles of LiOH can react with 1 mole of CO₂ to form 1 mole of lithium carbonate (Li₂CO₃) and 1 mole of water (H₂O). In addition, as shown in equation [10B], 2 moles of lithium hydroxide monohydrate (LiOH·H₂O) can react with 1 mole of CO₂ to form 1 mole of Li₂CO₃ and 3 moles of H₂O:

$$2LiOH + CO_2 \rightarrow Li_2CO_3 + H_2O \quad [10A]$$

$$2LiOH \cdot H_2O + CO_2 \rightarrow Li_2CO_3 + 3H_2O \quad [10B]$$

That is, CO₂ can be captured from the atmosphere and/or from an aqueous solution and then sequestered into a solid Li salt, i.e. Li₂CO₃. The CO₂ captured described in equations [10A] and [10B] can occur in either the gas or liquid phase.

Next, as shown in FIGS. 3A and 3B, the Li₂CO₃ generated in equations [11A or 11B] is converted into sodium carbonate (Na₂CO₃) or potassium carbonate (K₂CO₃) by treatment with NaOH or potassium hydroxide (KOH), respectively.

These reactions are shown below in equations [11A] and [11B], 1 mole of Li₂CO₃ can react with 2 moles of NaOH or 2 moles of KOH to form 2 moles of LiOH and 1 mole of sodium carbonate (Na₂CO₃) or 1 mole of potassium carbonate (K₂CO₃):

$$Li_2CO_3 + 2NaOH \rightarrow 2LiOH + Na_2CO_3 \quad [11A]$$

$$Li_2CO_3 + 2KOH \rightarrow 2LiOH + K_2CO_3 \quad [11B]$$

In addition to regenerating LiOH, the generated Na₂CO₃ or K₂CO₃ can be used in the next step to capture more CO₂ (see equations [8A] and [8B] below).

The reaction of Li₂CO₃ with NaOH/KOH to generate LiOH and Na₂CO₃/K₂CO₃ as shown in equations [11A] and [11B] occurs in the liquid phase.

Next the reaction products from equations [11A and 11B] are exposed to CO₂ again using the gas/liquid or liquid/liquid or gas/solid mass transfer methodology described above.

The mass transfer results in reactions wherein 1 mole of Na₂CO₃ or 1 mole of KHCO₃ can react with 1 mole of CO₂ and 1 mole of H₂O to generate 2 moles of NaHCO₃, or 2 moles of KHCO₃ as shown in equations [12A] and [12B]:

$$Na_2CO_3 + CO_2 + H_2O \rightarrow 2NaHCO_3 \quad [12A]$$

$$K_2CO_3 + CO_2 + H_2O \rightarrow 2KHCO_3 \quad [12B]$$

This reaction can be perpetuated (subject to solids concentration in the aqueous phase) as long as the pH is elevated to basic by the addition of NaOH or KOH.

As shown on FIGS. 3A and 3B and described in the Mass Balance (Table 4), the LiOH is recycled and the overall process requires one mole of NaOH or LOH per mole of captured CO₂. The overall reaction produces one mole of NaHCO₃ per mole of CO₂ captured.

The process chemistry uses a method to regulate the process residence time. This involves the flow of liquids through Loop 1 and Loop 2 of the 2-Loop Process sequence. Loop 2 is a slip stream of the Loop 1 process stream. Loop 2 is actually two or more process loops with the same mechanical configurations that may or may not handle the same volume of process liquid. The multiple Loop 2 process equipment systems can have equal or dissimilar reaction vessel cross sectional areas.

The ratio or percent of the two or more Loop 2 process liquid flow paths can be monitored and regulated as required to provide ideal reaction residence time. The overall Loop 2 process flow cross sectional area is adjusted as required to achieve a liquid flow velocity that slows or increases the residence time within the reactor. The residence time is adjusted to allow the reaction(s) within the loop to achieve the desired percent process completion. The optimum process tuning is achieved by changing the overall cross-sectional area of the Loop 2 process path until any further change in cross-sectional area will adversely affect the desired percent of process completion within Loop 2.

The Loop 1 process path residence time can also be adjusted as required obtaining the optimum percent completion for processes that occur in that loop. This is done by adjusting the process liquid flow rate through the loop and that is done by varying the split of liquid diverted to the Loop 2 reactors.

The process control logic effectively monitors and adjusts the number of Loop 2 paths and the split ratio between Loop 1 and Loop 2 by responding to analytical sensors that determine concentrations of compounds in the liquid and gas stream plus flow rate sensor data and known loop cross sectional areas of the loops to create the desired residence time within Loop 1 and Loop 2 to effect the desired reaction completions in both loops. This process automatically adjusts to variations on the ratio of concentrations of the target gases and the total amount of each target gas.

The disclosure provides methods for the removal of $NaHCO_3$ from the Loop 2 recycling process without removing the LiOH from the same process liquid. This is done through a forced precipitation using an alcohol at the add alcohol to the Loop 2 slip stream step. The selection of a suitable alcohol is critical to the success of this process.

Two alcohols were identified as ideal for this process. Each has a unique set of ideal physical characteristics. Methanol is ideal because it is miscible in water without forming an azeotrope, has a low solubility for $NaHCO_3$ when compared to $H_2O$ and a solubility for LiOH that is equal to or higher than that of $H_2O$. Methanol is the only alcohol that does not form an azeotrope with water, and that feature allows a more complete separation of the alcohol and water during distillation. Methanol has a boiling point of 64.7° C. This low temperature allows recovery of the methanol through distillation using waste heat available from a combustion process. Tert-butanol has a solidification temperature at 25°-26° C. This provides a solution for applications of this methodology that have access to large heat sinks, for example processes that are installed aboard seagoing ships. The ocean can provide chilling required for solidification of the tert-butanol at no cost. This feature allows its subsequent separation from the process stream by centrifuge or filtering.

This separation sequence utilizes the fact that $NaHCO_3$ has a lower solubility in alcohol than does LiOH. For example, the LiOH solubility in water is between 108 and 128 g/L at process temperatures, and $NaHCO_3$ solubility in water is between 69 and 169 g/L at ambient temperatures. However, when an alcohol such as ethanol is added to an aqueous solution of LiOH, its solubility remains around 23 g/L, whereas the solubility of an aqueous solution of $NaHCO_3$ in ethanol is 0.

The difference in solubility between $NaHCO_3$ and LiOH allows for this forced precipitation step: $NaHCO_3$ precipitates leaving the LiOH in solution. Methanol, tert-butanol (or other suitable alcohols) can be added to this slip stream liquid to affect the precipitation of the sodium or potassium salts.

An alcohol, preferably methanol or tert-butanol, can be added to the Loop 2 liquid. The volume of alcohol is proportional to the Loop 2 liquid flow rate, process liquid temperature and the concentrations of compounds in the process stream that can influence precipitation of the $NaHCO_3$ or $KHCO_3$. The alcohol can be added to the Loop 2 process liquid flow piping using any conventional dosing method that facilitates good liquid mixing with minimal introduction of static pressure in the process flow systems.

The regenerated LiOH remains in the aqueous reaction mixture, which can be reused to sequester additional $CO_2$ through Loop 1, and the solid $NaHCO_3$ can be converted into a paste and washed or dried depending on the desired purity or physical state. For example, a thin film dryer, centrifuge or other similar device can remove the moisture present in the $NaHCO_3$ paste or slurry. The solid $NaHCO_3$ is then packaged for commercial use or deposited in the ocean in exchange for a tax donation.

In the event the Loop 1 and optional $SO_2$ pre scrubber did not remove all of the $SO_2$ from the gas stream, any remaining $SO_2$ can react with the LiOH to form $Li_2SO_3$. This is also removed from the recirculated liquor in the forced two step precipitation of $NaHCO_3$ and $Li_2SO_3$ step of the Loop 2 process. The process follows the following reaction steps shown below in equations [13] through [17]:

$$2LiOH(saturated)+SO_2 \rightarrow Li_2SO_3+H_2O \quad [13]$$

$$Li_2SO_3+H_2O+SO_2 \rightarrow 2LiHSO_3 \quad [14]$$

$$Li_2SO_3+H_2SO_4 Li_2SO_4+SO_2+H_2O \quad [15]$$

$$Li_2SO_4(conc.)+Na_2CO_3 Li_2CO_3\downarrow+Na_2SO_4 \quad [16]$$

$$Li_2CO_3+2NaOH \rightarrow 2LiOH+Na_2CO_3 \quad [17]$$

The chemistry used in the disclosed $CO_2$ sequestering process has been checked against other compounds commonly found in combustion exhaust and it was determined that no significant omissions occur that are not remedied in this process.

Figure 4A:
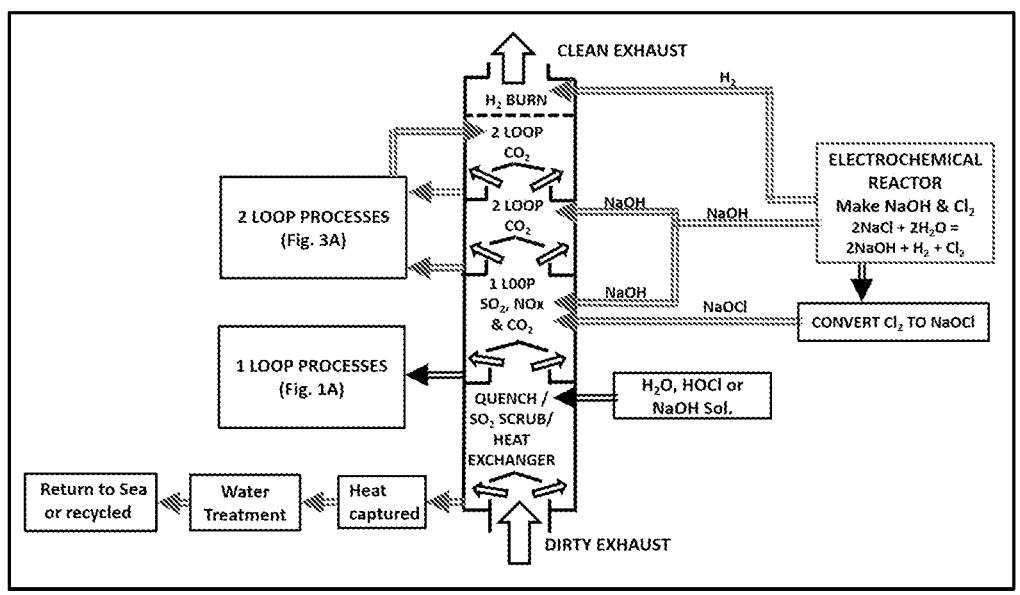
FIGS. 4A and 4B illustrates an embodiment of how the 1-Loop Process and the 2-Loop Process can be configured.
Figure 4B:
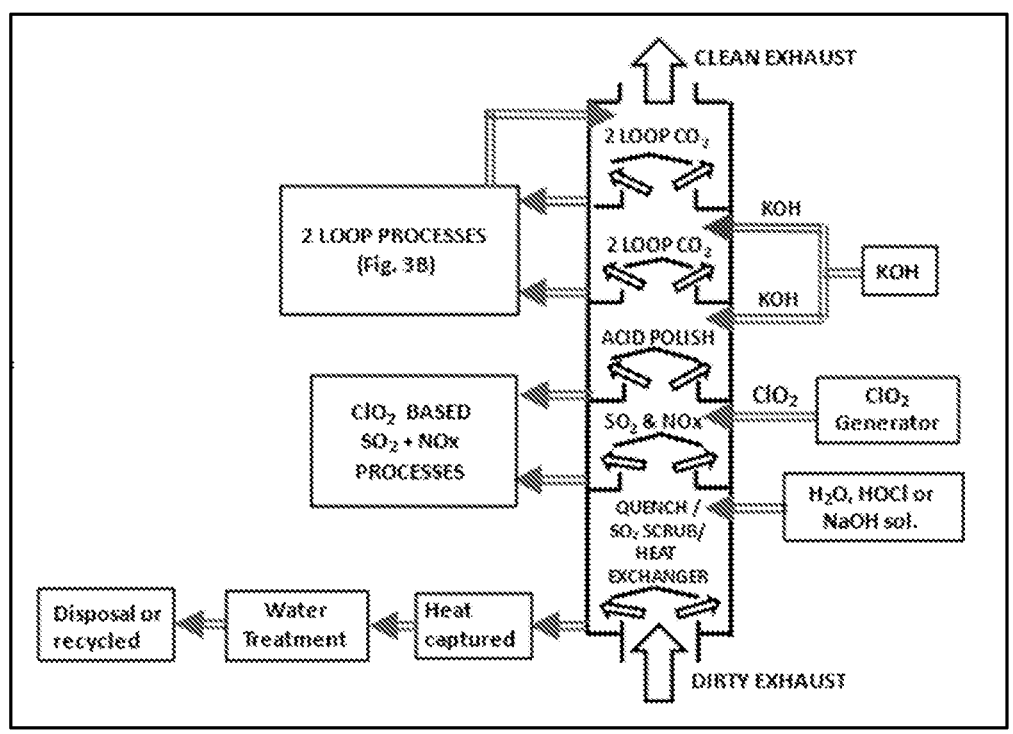

FIGS. 4A and 4B illustrate an embodiment of how the $CO_2$, NOx and $SO_2$ capture and reuse methodology disclosed herein for the 1-Loop Process and the 2-Loop Process can be configured. The sequence is important, but the steps can occur in one, two or more separate but linked reaction vessels. The process can also occur in two or more parallel reaction vessels provided all of the parallel vessels use the reaction sequence shown here. The 1-Loop Process and 2-Loop Processes can be sequentially combined within a single scrubbing vessel or separated into two or more components.

FIGS. 4A and 4B also shows how the 1Loop and 2Loop Processes are typically preceded by a $SO_2$ scrubber and/or exhaust gas cooling/economizer/quenching module when the exhaust gas is above ambient temperatures. The right side of the diagram also shows the generation of reagents and their flow into the 1-Loop Process and the 2-Loop Process.

FIGS. 4A and 4B illustrate an embodiment of how the sequence of the five processes grouped within the black rectangle named "1 LOOP PROCESSES" of FIG. 1 can be integrated into a scrubbing process within a single scrubbing vessel. This combination of chemical reactions is defined as the 1-Loop Process. It is designed to treat the effluent exhaust gas either from combustion, or from other chemical and biological sources of $CO_2$, NOx and $SO_2$.

The 1-Loop and 2-Loop Process diagrams on the left side of FIGS. 4A and 4B are displayed in full detail in FIGS. 1, 3A and 3B, respectively. The configuration shown in FIGS. 4A and 4B is only an example of the possible configuration and is not meant to be limiting. The reagent generation, conversion and distribution technology shown in FIGS. 4A and 4B is described in greater detail in FIG. 5.

FIGS. 4A and 4B also shows hydrogen gas generated during the electrochemical (E-Chem) production of NaOH and $Cl_2$ vented to a burner downstream of the 2-Loop Process. This burn module can include a metallic grate across the gas flow. When present, the grate is heated by the hydrogen gas combustion. The hot metallic surface and/or burner flame are designed to combust remaining hydrocarbons and warm the exhaust gas to minimize a condensate cloud at the exhaust stack.

Figure 5:
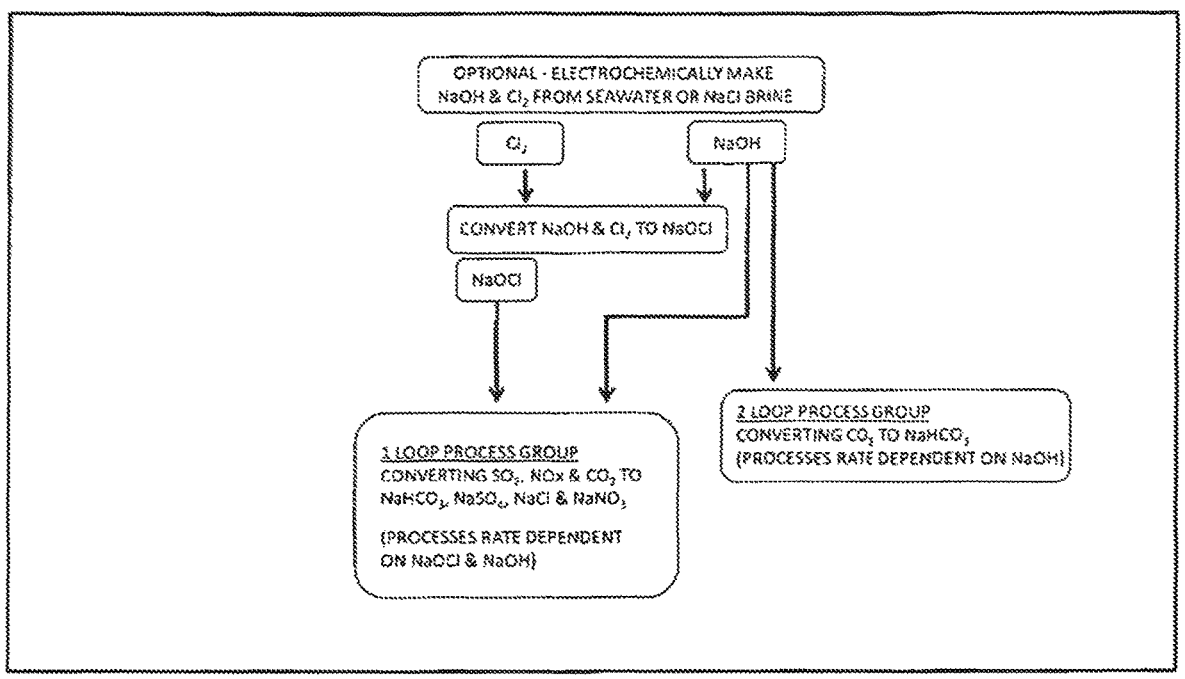
FIG. 5 illustrates an embodiment of the reagent generation, conversion and distribution technology for the 1-Loop Process and 2-Loop Process.

FIG. 5 illustrates how seven separate gas scrubbing processes are grouped into two scrubbing groups:

The $SO_2$, NOx and $CO_2$ scrubbing chemical reactions identified as the 1-Loop Process is grouped within a rectangle enclosed in a double solid line.

Two additional $CO_2$ capture process identified as the 2-Loop Process is shown within the rectangle enclosed in a dashed line FIG. 5 also shows that a single electrochemical generator (or membrane) can make the primary chemical consumables for all seven processes from seawater or other solution that contains NaCl without other compounds that will interfere with the E-Chem process. The methodology for E-Chem manufacture of NaOH and $Cl_2$ from NaCl is well practiced in industry. Newer and more energy efficient and less environmentally challenging technology is emerging. The improved technology is recommended, but the disclosed technology is not dependent upon any one electrochemical methodology.

The conversion of $Cl_2$ into NaOCl is also well practiced methodology. This disclosure is not dependent on any one methodology but recommends the most energy efficient and environmentally noninvasive method be employed.

FIG. 5 also show how reagent usage made by the E-Chem process can be balanced. Multiple methods for capturing and repurposing $CO_2$ and $NO_x$ are present; at least one of each type of process uses NaOCl as a reagent and another uses NaOH as a reagent. This dual reagent consumption option allows an allocation of the $CO_2$ and/or $NO_x$ scrubbing to either or both reagents as required to equalize the overall reagent production by the E-Chem process.

Only one method for $SO_2$ capture is shown in FIG. 5, but it can be augmented with an optional $SO_2$ pre-scrubbing stage.

The integration of multiple $CO_2$, NOx and $SO_2$ treatment methods within this overall process that use NaOH or NaOCl as consumables make it possible to accommodate fluctuations in the ratios of $CO_2$, NOx and $SO_2$ in the waste gas stream without wasting reagents.

For example, three processes for the removal of $CO_2$ were deliberately included in this technology package. One of the $CO_2$ processes utilizes NaOCl as a consumable and the other two use NaOH/KOH. This is important because the $CO_2$ mass loading in some process gas, for example combustion, is typically 40× higher than the NOx or SOx mass loading so it is essential to treat part of the $CO_2$ with NaOH/KOH and the rest with NaOCl in order to balance the chemical availability of reagents from the E-Chem conversion of NaCl. Variations in the NOx and $SO_2$ concentrations are monitored and easily accommodated by adjustments in the overall ratio selected for the $CO_2$ reactions. The process control system logic adjusts the percentage of each of the $CO_2$ sequestration processes through a multifaceted process previously described.

The 1-Loop Process described herein is designed to operate as a prerequisite for the 2-Loop Process. However, the 1-Loop Process and 2-Loop Process can also be used in a standalone mode.

The 1-Loop Process can also act as a polishing scrubber. In one example the 1-Loop Process can follow an $SO_2$ abatement scrubbing device of any design or a NOx abatement scrubbing device of any design. In another example, the 1-Loop Process can follow a quencher that captures waste heat from the exhaust gas stream for use in the recycling reactants used in the 1-Loop Process or for other purposes.

Furthermore, the 2-Loop Process can be used as a standalone technology if the gas stream does not contain compounds that can react with the process chemicals, for example: $SO_2$ and NOx.

EXAMPLES

Figure 6:
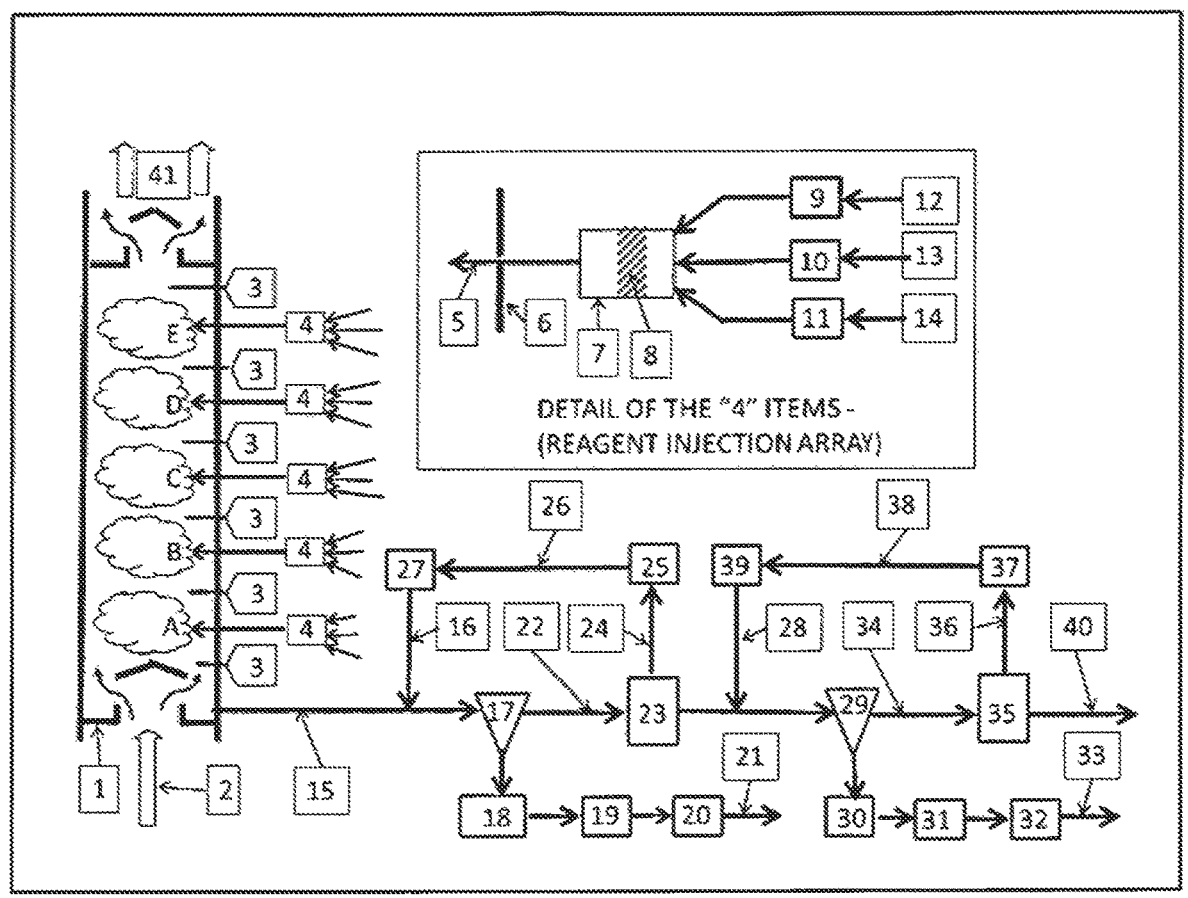
FIG. 6 illustrates an embodiment of the process flow instruments used in the 1-Loop Process.

Example 1: The process flow instruments used in the 1-Loop Process are described in FIG. 6 and in Table 1 below:

TABLE 1

| KEY | DESCRIPTION |
|---|---|
| NOTE | The following summarize reactions that are occurring at each step in the overall reaction sequence. This information is also provided in the 1Loop Process diagram. Pumps and blowers required to move liquids and gases are not shown. There are many sensors and a process control system that are not shown. |
| A | $SO_2 + NaOCl + H_2O = NaCl + H_2SO_4$ |
| B | $4NO + 4NaOCl + H_2O = 4NaCl + 4HNO_3$ |
| C | $CO_2 + NaOCl + H_2O = HOCl + NaHCO_3$ |
| D | $NO + NO_2 + 2NaOH + NaOCl = 2NaNO_2 + H_2O$ |
| E | $CO_2 + NaOH = NaHCO_3$ |
| NOTE | All components and systems described below are assumed to be made from materials that are compatible with the chemi cal s/reagents, and process pressures, temperatures etc. that are applicable and relevant for the specific application. |
| 1 | Reaction vessel—typically cylindrical with one or more inlets for untreated gas at one end (Item 2) and one or more exits for treated gas at the other end (Item 41). The reaction vessel does not need to be partitioned because of the novel chemical compatibility between the five processes identified as A-E. The five chemical processes synergistically assist each other. The byproducts of preceding reactions enhance reaction kinetics of subsequent reactions. Each process requires its reaction residence time prior to the initiation of the next process. The reaction byproducts of these chemical processes are salts, and these are dissolved/suspended into aqueous mist concurrently sprayed into the reaction vessel to introduce precursor (reagents) required for the chemical processes. The mist containing dissolved/suspended reaction byproducts coalesce within the reaction vessel and migrates as liquid to the vessel drain where it is removed for further processing. The vessel can be of any shape and configuration. It need not be linear as shown or oriented as shown. The vessel can be one or more vessels in parallel or linear configurations. The vessel is designed to operate at the exhaust gas system pressures and meet site requirements for space through flexibility of equipment orientation. When the vessel is in a |

TABLE 1-continued

| KEY | DESCRIPTION |
|---|---|
| | vertical orientation, gas/liquid separators are provided near the gas inlet and gas exit ends of the reaction vessel. The gas/liquid separators are used to prevent liquid condensate from draining past the separator. The gas/liquid diverter can be of any design, for example the coolie caps design shown, or bubble caps. |
| 2 | Gas (typically air) containing one or more of the following: CO2, NOx, $SO_2$ (Target Gases) is introduced into the reaction vessel. The gas can be at any normal industrial process working pressure. Ideally the pressure is slightly negative with respect to the surrounding atmosphere to prevent any exhaust gas from leaking into the atmosphere. The gas can be at any temperature between 10° C. and 90° C. |
| 3 | Gas sensor array. Local and/or remote instrumentation for qualitative and quantitative analysis of $CO_2$, NOx, $SO_2$ and other compounds in the reaction mixtures. Instrumentation is also provided for gas temperature, pressure, and other process variables. The sensors are connected to a process logic control (PLC) system that executes a process specific logic that regulates process variables in a way that safely provides optimum reductions in Target Gases and minimizes consumption of consumable compounds. |
| 4 | Reactant Injection Array. This equipment proportionally introduces and mixes two or more different reactants (as liquids or gas) and then sprays the mixture into the reaction vessel in accordance with PLC program's parameters for mixture ratios, flow rate, and flow duration. |
| 5 | Detail of "4"—Spray nozzle(s) of any type of air or mechanically atomized design that are configured in countercurrent and/or co-current and/or tangential orientation with respect to the gas flow. Tangential orientation is typically done at an angle or series of angles that promote gas mixing. |
| 6 | Detail of "4"—Wall of reaction vessel (Item 1) |
| 7 | Detail of "4"—Nozzle assembly mixing chamber. This chamber provides an isolated environment for mixing reactants used for each of the five primary chemical processes identified as A-D and subordinate reactions that precede or follow the primary reactions. |
| 8 | Detail of "4"—Static Mixer of any appropriate design. |
| 9 | Detail of "4"—Remotely controlled proportional high-pressure chemical pump of any design. Preferably a pump that provides consistent pressure. The pressure range can be anywhere between 10 and 3000 psi. Preferably 20-300 psi above the gas pressure in the reaction vessel. The pump's surfaces exposed to reactants are made of any material that is compatible with the reactant(s) and pressure. Reactants used include, but are not limited to, a hypochlorite compound, for example sodium hypochlorite (NaOCl), or an alkaline compound, for example sodium hydroxide (NaOH), or a mineral acid, for example hydrochloric (HCl). |
| 10 | Detail of "4"—This is a second of two or more remotely controlled proportional high-pressure chemical pumps of any design with attributes described in Item 9 above. |
| 11 | Detail of "4"—Remotely controlled valve to regulate the addition of a gas into the nozzle assembly mixing chamber (Item 7). One or more of these devices add gas into the mixing chamber at one or more locations. The selection of gas injection point(s) is configured to provide optimum reaction kinetics. |
| 12 | Detail of "4"—Chemical storage, transfer pump(s) and interconnecting piping. The reactants are stored in any appropriate quantity within tanks or vessels made of material that is compatible with the reactant. The reactants can be but are not limited to a hypochlorite compound, for example sodium hypochlorite (NaOCl), or an alkaline compound, for example sodium hydroxide (NaOH), or a mineral acid, for example hydrochloric (HCl). |
| 13 | Detail of "4"—This is the second of several sets of chemical storage, transfer pump(s) and interconnecting piping with same parameters described for Item 12. |
| 14 | One or more gas compressor(s), pressure vessel(s) and interconnecting piping, valving, and other devices. The portions of the equipment exposed to chemicals are made of materials compatible with the gas(s) and pressure of the application. There can be one or more gasses introduced into the mixing chamber or several gasses can be pre-combined and introduced collectively into the mixing chamber. |
| 15 | Piping with other required equipment to move drainage from the reaction vessel (Item 1) to process equipment.<br>There are two forced precipitation loops in this diagram. The first is inclusive of Items 15 through 27 and the second is inclusive of Items 28 through 40. Only one loop is required if all four salts produced in reactions A-E (sodium bicarbonate, sodium sulfate, sodium nitrate and sodium chloride) are removed as a group with a ketone like acetone. However, sodium bicarbonate and sodium sulfate can be segregated from the other salts by treating the mixture with a polar solvent, for example an alcohol, preferably methanol. If this segregation option is elected, two precipitation loops are required. The first loop will use a polar solvent, for example methanol, and the second loop will use a ketone, for example acetone.<br>The following process description explains the two loop option. |
| 16 | Piping to convey solvent (for example an alcohol like methanol) to a point of injection and mixing at the intersection between Item 16 piping and Item 15 piping. The point of introduction includes methods of statically mixing the liquids. |
| 17 | Device to separate precipitated salts and the aqueous supernatant. The device can use any technology. Examples include centrifuge, belt press, and separatory funnel. The aqueous feedstock to the separation device contains salts made in the reaction chamber and dissolved or suspended in water that is introduced to the reaction chamber, preferably as a mist. The mist subsequently condenses and is collected at |

TABLE 1-continued

| KEY | DESCRIPTION |
|---|---|
| | a vessel drain. Salt solubility is maintained prior to chemically forced precipitation to prevent clogging in piping and other equipment. The novel chemically forced precipitation process begins when the polar solvent with specific chemical attributes is added to the liquid mixture containing the salts at the intersection of piping described in Item 15, and the piping between Item 16. The precipitation process continues within the separation device (Item 17). The novel chemical forced precipitation occurs because the polar solvent interacts with the polar water to diminish the available water available to hold the salt ions in solution. The rate of precipitation is directly related to the chemical characteristics of the polar solvent, the ratio of polar solvent to water in the mixture, the process temperature and pressure. |
| 18 | Solids conveying device and storage vessel for precipitated salts (separatory sludge). This includes a screw conveyor or other device to transport the sludge to next treatment process. The conveyance device is enclosed and externally heated to separate residual solvent from the sludge. The solvent vapor is routed to piping described in Item 24. An inert gas, for example nitrogen, is introduced into the sealed conveyance device to prevent inadvertent solvent combustion. The conveying device size and material of construction are commensurate with chemistry of conveyed materials and process flow requirements. |
| 19 | Sludge processing. This includes subsequent separation of the two or more components in the sludge and/or product rinsing as required for end product requirement. |
| 20 | Supplemental sludge processing. This includes drying and packaging as required to meet end product requirements. |
| 21 | Conveyance device for final product(s). This includes and is not limited to storage, weighing, loading and other steps required for relocating product to a new location. |
| 22 | Transport supernatant from precipitate and separation areas as described in items 16 & 17 above. This includes storage devices, piping, pumps, and other equipment required to manage product flow and move liquid into distillation device (Item 23). |
| 23 | Distillation device(s) of any type that will separate solvent, for example methanol from the water, and other compounds dissolved in the supernatant liquid. The temperature is relevant to the polar solvent (methanol) used. The device(s) includes all necessary instrumentation, process control equipment, and liquid storage, to interface this equipment with the rest of the process flow sequence. |
| 24 | Equipment to transfer polar compound (methanol) vapor from the distillation devices (Item 23). This includes piping, pumps, and other devices. |
| 25 | Vapor condensation equipment and condensate storage equipment. This includes a heat exchanger of any relevant design, condensate storage vessel(s), and any required vents, sensors, process control, and other devices necessary to integrate the condensation and storage processes into the overall process flow. |
| 26 | Piping to transport the liquid polar solvent. This includes all piping, pumps, and flow control devices necessary. |
| 27 | Remotely controlled proportional metering pump at the required pressure and flow necessary to effectively introduce the polar solvent, for example methanol via piping and other appurtenant devices described in Item 16 into the effluent conveyed from the reaction vessel (Item 1) in piping described in (Item 15). Ideally a pump with consistent fluid flow. |
| 28 | Piping and other appurtenant devices including sensors required to transport a polar solvent, for example a ketone like acetone into the water byproduct of distillation Item 23. The integration of the acetone and distillation byproduct occurs at the intersection of piping that transports the acetone and piping that transports the distillation byproduct. The point of introduction includes a method of static mixing the two liquid streams together. |
| 29 | Device to separate precipitated salts and the aqueous supernatant. The device can use any technology. Examples include centrifuge, belt press, and separatory funnel. The aqueous feedstock to the separation device contains salts made in the reaction chamber and dissolved or suspended in water that is introduced to the reaction chamber, preferably as a mist. The mist subsequently condenses and is collected at a vessel drain. Salt solubility is maintained prior to chemically forced precipitation to prevent clogging in piping and other equipment. The novel chemically forced precipitation process begins when the polar solvent with specific chemical attributes is added to the liquid mixture containing the salts at the intersection of piping described in Item 28, and the piping between Items 23 & 29. The precipitation process continues within the separation device (Item 29). The novel chemical forced precipitation occurs because the polar solvent interacts with the polar water to diminish the available water available to hold the salt ions in solution. The rate of precipitation is directly related to the chemical characteristics of the polar solvent, the ratio of polar solvent to water in the mixture, and the process temperature and pressure. |
| 30 | Solids conveying device and storage vessel for precepted salts (separatory sludge). This includes a screw conveyor or other device to transport the sludge to the next treatment process. The conveyance device is enclosed and externally heated to separate residual solvent from the sludge. The solvent vapor is routed to piping described in Item 36. An inert gas, for example nitrogen, is introduced into the sealed conveyance device to prevent inadvertent solvent combustion. The conveying device size and material of construction are commensurate with chemistry of conveyed materials and process flow requirements. |

TABLE 1-continued

| KEY | DESCRIPTION |
|---|---|
| 31 | Sludge processing. This includes subsequent separation of the salts and or rinsing as required for end product requirement. |
| 32 | Supplemental sludge processing. This includes drying and packaging as required to meet end product requirements. |
| 33 | Conveyance device for final product(s). This includes and is not limited to storage, weighing, loading and other steps required for relocating product to a new location. |
| 34 | Transport supernatant from precipitate separation device (Item 29). This includes storage devices, piping, pumps, and other equipment required to manage product flow and move liquid into distillation device (Item 35). |
| 35 | Distillation device(s) of any type that will separate acetone from the water and other compounds in the supernatant produced in Item 29 separation device used in the ILoop process. The device(s) includes all necessary devices to interface this equipment with the rest of the process flow sequence. |
| 36 | Piping and other devices to transfer vapor phase solvent, for example acetone from the Distillation devices (Item 35) to Item 36. This includes piping, pumps, and other devices necessary to integrate this system into the overall process flow. |
| 37 | Solvent vapor condensation and condensate storage equipment. This includes a heat exchanger of any relevant design, condensate storage vessel(s), and any required vents, level control instrumentation, process control equipment, and liquid storage, sensors, process control and other devices necessary to integrate the condensation and storage processes into the overall process flow. |
| 38 | Piping to transport the acetone (or similar solvent). This includes all piping, pumps, and flow control devices necessary. |
| 39 | Remotely controlled proportional metering pump at the required pressure and flow necessary to effectively introduce the polar solvent, for example acetone via piping and other appurtenant devices described in Item 28 into the effluent conveyed from the distilling device (Item 23) in piping between Item 23 and (Item 29). Ideally a pump with consistent fluid flow. |
| 40 | Commercially valuable water with reduced concentrations of $NaHCO_3$, $Na_2SO_4$, $NaCl$ and $NaNO_3$. A portion of the water can be reused (recycled) in mixtures of reactants introduced into the reaction vessel (Item 1) via nozzles described in Item 4. |
| 41 | Gas containing lower concentrations of one or more of the following: $CO_2$, NOx, $SO_2$. The gas can be at any pressure. Ideally the pressure is slightly negative with respect to the surrounding atmosphere to prevent any exhaust gas from leaking into the atmosphere. |

Figure 7:
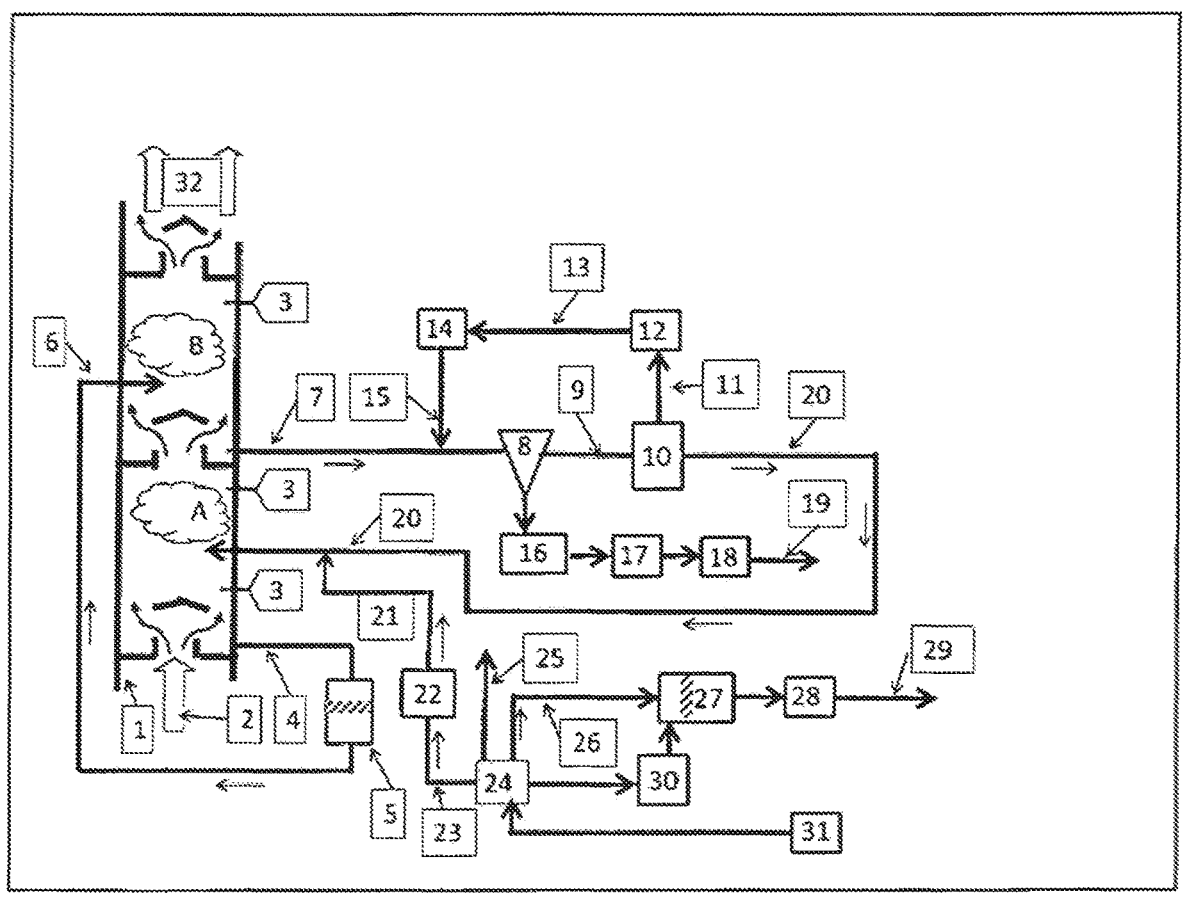
FIG. 7 illustrates an embodiment of the process flow instruments used in the 2-Loop Process.

Example 2: The process flow instruments used in the 2-Loop Process are described in FIG. 7 and in Table 2 below:

TABLE 2

| KEY | DESCRIPTION |
|---|---|
| NOTE | The following summarize reactions that are occurring at each step in the overall reaction sequence. This information is also provided in the 2Loop Process diagram. |
| A | $2LiOH + CO_2 = Li_2CO_3 + H_2O$ |
| B | $Na_2CO_3 + CO_2 + H_2O = 2NaHCO_3$ |
| NOTE | This process focuses on the removal of $CO_2$ from a gas stream. However, lithium hydroxide (LiOH) is not specific to $CO_2$. LiOH reacts with nitrogen compounds, for example NO & $NO_2$, and also reacts with sulfur compounds, for example $SO_2$ and $H_2S$. Some of the reactions will actually prevent the LiOH from being recycled with NaOH, therefore it is important to pretreat an exhaust gas stream with the 1Loop process described in this patent to eliminate the sulfur and nitrogen compounds from the gas prior to treatment of $CO_2$ with LiOH. All components and systems described below are assumed to be made from materials that are compatible with the chemicals/reagents, and process pressures, temperatures etc. that are applicable and relevant for the specific application. Pumps and blowers required to move liquids and gases are not shown. There are many sensors and a process control system that are not shown. |
| 1 | Reaction vessel-typically cylindrical with one or more inlets for untreated gas at one end (Item 2) and one or more exits for treated gas at the other end (Item 32). The vessel can be of any shape and configuration. It need not be linear as shown or oriented as shown and it can be one or more vessels in parallel and/or linear configurations. The vessel is designed to operate at a wide range of exhaust gas system pressures and meet site requirements for space through flexibility of equipment orientation. The vessel is divided into 2 sequential zones, that are defined by the vessel walls and separated by three gas/liquid separators that allow gas to pass from zone to zone while preventing liquid from passing from zone to zone. The gas/liquid separators are used to prevent liquid condensate formed within each zone from draining past the entrance end of any reaction vessel zone. The gas/liquid diverter can be of any design, for example when used with a vessel that has a vertical orientation as shown, the coolie caps design shown, or bubble caps or equal are required. When the vessel is in a horizontal, or near horizontal orientation, a separator with hole(s) for passage of gas is located at the upper portion of the vessel zone partitions. Said another way, partitions used in this application require penetrations for gas that are located at other than the areas near the vessel's bottom. This hole pattern requirement allows gas to pass from zone to zone but prevents liquid from migrating from zone to zone. In this application, the coolie caps or equal, are not required to prevent liquid from falling between vessel zones. Chemical processes identified as A & B are designed to occur sequentially in separate reaction vessel zones. The reaction byproducts of these chemical processes are salts, and these are dissolved/suspended into the aqueous mist sprayed into the reaction vessel to introduce precursor (reactants) required for the chemical processes. The mist with dissolved/suspended reaction byproducts coalesce within the reaction vessel zones and migrates as liquid to the vessel zone drain where it is removed for further processing. |

TABLE 2-continued

| KEY | DESCRIPTION |
|---|---|
| 2 | Gas (typically air) containing an elevated concentration of $CO_2$. Because LiOH used in this 2Loop process is not selective to just $CO_2$, it is strongly recommended that exhaust gas be treated with the 1Loop process described in this patent before the gas is treated with this 2Loop Process for $CO_2$ capture and sequestration. The gas introduced to this 2Loop Process can be at any normal industrial process working pressure. Ideally the pressure is slightly negative with respect to the surrounding atmosphere to prevent any exhaust gas from leaking into the atmosphere. The gas can be at any temperature between 10° C. and 90° C.. |
| 3 | Gas sensor array. Local and/or remote instrumentation for qualitative and quantitative analysis of $CO_2$, NOx, $SO_2$ and other compounds in the reaction mixtures. Also, instrumentation for gas temperature pressure, and other process variables. The sensors are connected to a process logic control (PLC) system that executes a process specific logic that regulates process variables in a way that safely provides optimum reductions in $CO_2$ while minimizing consumption of consumable compounds. |
| 4 | Piping and other equipment to transport liquid condensate from the first (lower) reaction vessel zone. |
| 5 | Reaction chamber of any shape, cylindrical is preferred, with static mixer of any kind. Vessel size is based on process liquid temperature, pressure, and the concentrations of reactants. These and other variables are considered when determining the volume and ideal shape required to provide efficient mixing of reactants and the residence time necessary for the completion of the following reaction: $Li_2CO_3 + 2NaOH = 2LiOH + Na_2CO_3$. The vessel is made of materials that are compatible with the process chemistry and physical constraints. |
| 6 | Piping, pumps, and other equipment required to move the aqueous mixture made in Item 5 above. The liquid is sprayed into the second (upper) zone of the reaction vessel (Item 1). Spray nozzle(s) of any type including but not limited to air or mechanically atomized design are oriented in countercurrent and/or co-current and/or a tangential orientation with respect to the gas flow. The tangential orientation is typically done at an angle or series of angles that promote gas mixing. |
| 7 | Drain line with pumps and other equipment required to transport liquid condensate from the second (upper) zone of the reaction vessel. |
| 8 | Device to separate the precipitated sodium bicarbonate ($NaHCO_3$) and the aqueous supernatant. The device can use any technology. Examples include centrifuge, belt press and separatory funnel. Sodium bicarbonate is made in the second (upper) zone of the reaction chamber according to the "B" reaction ($Na_2CO_2 + CO_2 + H_2O = 2NaHCO_3$). The concentration of $NaHCO_3$ in the aqueous solution prior to proprietary chemically forced precipitation is deliberately maintained at a level that will not precipitate until it is mixed with a polar solvent (preferably methyl alcohol). This is done to prevent piping and other equipment from becoming clogged with solids. The chemically forced precipitation process begins when the polar solvent is added to the liquid mixture conveyed in Item 7 piping to an intersection of piping in Item 7 and Item 15. The chemically forced precipitation continues within the separation device (Item 8). The addition of a polar solvent like methanol to the aqueous solution with dissolved sodium bicarbonate, creates a novel forced precipitation because the polar solvent interacts with the polar water to diminish the available water available to hold the bicarbonate and sodium ions in solution. The rate of precipitation is directly related to the chemical characteristics of the polar solvent, the ratio of polar solvent to water in the mixture, process pressure, and process temperature. The LiOH remains dissolved in the liquid supernatant because it is not affected by the addition of the correctly selected polar solvent. The separation device is enclosed. An inert gas, for example nitrogen is introduced into the sealed separation device to prevent inadvertent solvent combustion. This inert gas is transferred into the conveyance device described in Item 16 and then returned to the atmosphere during the condensation process described in Item 12. |
| 9 | Piping and other equipment to convey liquid supernatant to distillation device designated as Item 10. |
| 10 | Distillation device(s) of any type that will separate polar solvent, for example alcohol from the water and other compounds in the supernatant liquid. The temperature is relevant to the polar solvent (for example methanol) used. Ideally methanol is used because it does not form an azeotrope and is therefore more effectively separated from the water. The device(s) includes, in addition to the distillation equipment, all necessary instrumentation, process control equipment and liquid storage required to interface this equipment with the rest of the process flow sequence. Supernatant without the alcohol leaves the distillation device through piping and other equipment described in Item 20). |
| 11 | Pipe and pump or other appurtenant equipment required to transfer polar solvent vapor from distillation device (Item 10) to condensation and liquid storage device Item 12. |
| 12 | Vapor condensation equipment and condensate storage equipment for alcohol (or other polar solvent). This equipment includes a heat exchanger of any relevant design, condensate storage vessel(s), and any required pumps, vents, level control and other devices necessary to integrate the condensation and storage processes into the overall process flow. |
| 13 | Piping to transfer condensed (liquid) polar solvent (alcohol) from storage vessel included in Item 12 to the proportional metering pump (Item 14). |
| 14 | Remotely controlled proportional metering pump to deliver polar solvent at the required pressure and flow via piping described in Item 15 into the condensate from the upper portion of the reaction vessel conveyed in piping described in Item 7. Ideally a pump with consistent fluid flow. |
| 15 | Piping to convey polar compound (alcohol, preferably methanol) to a point of injection and mixing at the intersection between Item 7 piping and Item 15 piping. The point of introduction includes methods of statically mixing the polar compound with the aqueous process liquid conveyed in Item 7 piping. |
| 16 | Solids conveying device and storage vessel |

TABLE 2-continued

| KEY | DESCRIPTION |
|---|---|
|  | for precipitated sodium bicarbonate (NaHCO$_3$). This includes a screw conveyor or other device to transport the sludge to the next treatment process. The conveyance device is enclosed and externally heated to separate residual solvent from the sludge. The solvent vapor from the sludge joins solvent vapor from the supernatant in Item 11 piping. An inert gas, for example nitrogen, is introduced into the sealed conveyance device to prevent inadvertent solvent combustion. This inert gas is returned to the atmosphere during the condensation process described in Item 12. The conveying device size and material of construction are commensurate with the chemistry of conveyed materials and process flow requirements. |
| 17 | Optional NaHCO$_3$ conditioning system as desired to improve the purity of the compound for commercial use. This can be a wash and re-precipitation and drying device of any appropriate design. The product can be supplied as powder or a paste. |
| 18 | Storage of optionally cleaned NaHCO$_3$ product. Vessel can be of any appropriate size and shape. |
| 19 | Clean sodium bicarbonate (NaHCO$_3$). |
| 20 | Piping with pump and other devices to transfer the alcohol free supernatant to the first (lower) zone of the reaction vessel. The liquid is sprayed into the gas stream within the reaction vessel by any appropriate means. This includes but is not limited to low or high-pressure nozzles and air assisted nozzles. Lithium carbonate (Li$_2$CO$_3$) is made in the first (lower) zone of the reaction vessel by the reaction of CO$_2$ in the gas stream with lithium hydroxide (LiOH) in a sprayed liquid according to the stoichiometry identified as "A" Reaction: 2LiOH + CO$_2$ = Li$_2$CO$_3$ + H$_2$O. The liquid volume is maintained to ensure the lithium carbonate and other materials in solution remain in solution as it condenses and drains out of the reaction vessel. |
| 21 | Piping with a PLC controlled variable speed pump for introduction of NaOH into the condensate from the first (lower) portion of the reaction chamber. The NaOH is introduced at a stoichiometrically required rate to successfully deliver the reaction described in Item 5. This occurs at the intersection of Item 21 piping and Item 4 piping. A static mixer of any appropriate design is provided in Item 4 piping downstream of the point where the NaOH is introduced into the liquid. |
| 22 | NaOH storage tank with appropriate level, heating, pumps, and other devices. The tank is any appropriate size and shape. |
| 23 | Piping and other devices required to transfer NaOH from production in an Electrochemical NaCl cell (E-Cell), or BPED membrane device, or from commercial supply. |
| 24 | E-Cell when combined with an HCl fuel cell or separately a BPED membrane device are both designed to convert NaCl into NaOH and HCl. |
| 25 | Hydrogen (H$_2$) gas produced in the NaCl E-Cell if it is not connected to an HCl fuel cell. This gas is stored as a commercially viable product, utilized in another chemical process, or safely vented to atmosphere. |
| 26 | Piping and other equipment required to transfer NaOH made in the E-Cell or BPED membrane system to the NaOCl generator (Item 27). This option is used to create NaOCl as a reactant for the 1Loop process described elsewhere in this patent. |
| 27 | NaOCl generator of any appropriate design that utilizes Cl$_2$ gas or liquid HCl and NaOH as reactants. The reactants are provided by the combination of an NaCl E-Cell and HCl fuel cell, or separately a BPED membrane system. |
| 28 | NaOCl storage tank with vent to safe location or back into a process flow that utilizes NaOCl. |
| 29 | NaOCl supplied to the 1Loop processes (Diagram 1 and 1A). |
| 30 | Chlorine (Cl$_2$) storage tank. Optionally the Cl$_2$ is fed directly into the NaOCl generator (Item 27) and the produced NaOCl is used on the 1Loop process or sold as a commercially viable product. There is no need for chlorine storage when the NaCl E-Cell is coupled directly with a HCl fuel cell. |
| 31 | Liquid brine (NaCl) solution. This can be a high concentration brine or sea water. |
| 32 | Exhaust gas with little or no CO$_2$. |

The integrated CO$_2$, NOx and SO$_2$ processes disclosed herein are applicable to marine and land based applications. The inherent design of this series of processes provides it with the features necessary for marine applications. These same features can be applied to land applications if desired, or land applications can be segregated in ways that require larger equipment footprints. These features are summarized below:

The reaction chambers process the exhaust gas at velocities that allow the reaction chambers to be fractionally larger than the volume required for typical exhaust gas flow.

The reaction chambers can be oriented in any direction because they utilize mist reactions. The upward flow shown in the figures are only examples.

The process can generate the NaOH and NaOCl from seawater thereby not requiring storage aboard the vessel for NaCl.

The processes generate NaHCO$_3$ which is naturally used by the oceans for pH control. Direct disposal of this compound from the ship as it is underway will benefit the oceans. This eliminates the need for storage aboard the vessel for the NaHCO$_3$.

The processes disclosed herein segregate the NaNO$_3$ from the process stream and store it as a commercially viable paste.

The processes disclosed herein have the ability to treat the exhaust of a generation system required to make the electricity necessary to run the processes thereby emitting essentially no CO$_2$, NOx and SO$_2$ as a result of operating the combined group of processes.

The use of E-Chem generation for NaOH/KOH production would be of concern if it was done using outdated technology. Over the past few years the technology for NaOH/KOH generation has become progressively more environmentally friendly. Upgrades in electrode technology are already used in commercial production. Other recent technological breakthroughs show how the need for a cell membrane is eliminated. This most recent change is reported to reduce the electrical requirement to between ⅓ and ⅕ of conventional power requirement.

Table 3 shows the composition chemical composition of seawater that can be used to make the NaOH and NaOCl required for the disclosed processes.

TABLE 3

| Total molar composition of seawater (salinity = 35)[15] | | Seawater elemental composition (salinity = 3.5%)[citation needed] | |
| --- | --- | --- | --- |
| Component | Concentration (mol/kg) | Element ▼▲ | Percent by mass ▼▲ |
| $H_2O$ | 53.6 | Oxygen | 85.84 |
| $Cl^-$ | 0.546 | Hydrogen | 10.82 |
| $Na^+$ | 0.469 | Chlorine | 1.94 |
| $Mg^{2+}$ | 0.0528 | Sodium | 1.08 |
| $SO_4^{2-}$ | 0.0282 | Magnesium | 0.1292 |
| $Ca^{2+}$ | 0.0103 | Sulfur | 0.091 |
| $K^+$ | 0.0102 | Calcium | 0.04 |
| $C_T$ | 0.00206 | Potassium | 0.04 |
| $Br^-$ | 0.000844 | Bromine | 0.0067 |
| $B_T$ | 0.000416 | Carbon | 0.0028 |
| $Sr^{2+}$ | 0.000091 | Vanadium | $1.5 \times 10^{-11}$ – $3.3 \times 10^{-11}$ |
| $F^-$ | 0.000068 | | |

The Mass Balance in this study utilizes a 95% NO/5% $NO_2$ mix in the NOx, but value is approximate. The exact $NO/NO_2$ ratio will depend upon the actual time between NOx generation and scrubbing, gas temperature, and other compounds in the gas stream. It is also influenced by exposure to mist quenching prior to SOx scrubbing. Some of the $NO_2$ will dissolve into the quench water.

The disclosure also presents individual Mass Balance tables for the 1-Loop Process and the 2-Loop Process scrubbing stages. Literature reports widely divergent ratios for NOx and $CO_2$ in marine exhaust therefore this study calculates Mass Balance for the removal of 1 Kg each of $SO_2$, NOx and CO and then combines these based on a "typical car carrier type ship" with defined operational parameters. Table 4 illustrates the amount of $CO_2$ captured and repurposed based on 1 kg of $CO_2$ captured in the 2-Loop Process*.

TABLE 4

| Compound | Module | Made/Used | Moles | Kg | Total (Kg) | Net-Made/Used (Kg) |
| --- | --- | --- | --- | --- | --- | --- |
| $CO_2$ | Capture | Used | 11.36 | 0.50 | 1.0 | Used (CAPTURED) |
| $CO_2$ | Product | Used | 11.36 | 0.50 | | |
| LiOH | Capture | Used | 22.74 | 0.55 | 0 | |
| LiOH | Convert | Made | 22.74 | 0.55 | | |
| $Li_2CO_3$ | Capture | Made | 11.36 | 0.84 | 0 | |
| $Li_2CO_3$ | Convert | Used | 11.36 | 0.84 | | |
| $H_2O$ | Capture | Made | 11.36 | 0.21 | 0 | |
| $H_2O$ | Product | Used | 11.36 | 0.21 | | |
| NaOH | Convert | Used | 22.74 | 0.91 | 0.91 | Used |
| $Na_2CO_3$ | Convert | Made | 11.37 | 1.21 | 0 | |
| $Na_2CO_3$ | Product | Used | 11.37 | 1.21 | | |
| $NaHCO_3$ | Product | Made | 22.74 | 1.91 | 1.91 | Made |
| MeOH | Recycled | Recycled | 25.00 | 0.80 | | 1 |

*All mass is calculated at dry weight for 100% material.
*Methanol consumption through loss in $H_2O$ during distillation is an estimate.

Table 5 illustrates the amount of $CO_2$ captured by NaOCl based on 1 kg of $CO_2$ captured in the 1-Loop Process*.

TABLE 5

| Compound | Made/Used | Moles | Kg | Total (Kg) | Net Made/Used |
| --- | --- | --- | --- | --- | --- |
| $CO_2$ | Used CAPTURED | 22.72 | 1.00 | 1.00 | Used (CAPTURED) |
| NaOCl | Used | 22.72 | 1.69 | 1.69 | Used |
| $H_2O$ | Used | 22.72 | 0.41 | 0.41 | Used |

TABLE 5-continued

| Compound | Made/Used | Moles | Kg | Total (Kg) | Net Made/Used |
| --- | --- | --- | --- | --- | --- |
| HOCl | Made | 22.72 | 1.19 | 1.19 | Made |
| $NaHCO_3$ | Made | 22.72 | 1.91 | 1.91 | Made |

Table 6 illustrates the amount of $SO_2$ captured by NaOCl based on 1 kg of $SO_2$ captured in the 1-Loop Process*.

TABLE 6

| Compound | Made/Used | Moles | Kg | Total (Kg) | Net Made/Used |
| --- | --- | --- | --- | --- | --- |
| $SO_2$ | Used CAPTURED | 15.61 | 1.00 | 1.00 | Used (CAPTURED) |
| NaOCl | Used | 15.61 | 1.16 | 1.16 | Used |
| $H_2O$ | Used | 15.61 | 0.28 | 0.28 | Used |
| NaCl | Made | 15.61 | 0.91 | 0.91 | Made |
| $H_2SO_4$ | Made | 15.61 | 1.53 | 1.53 | Made |

*All mass is calculated at dry weight for 100% material.

Table 7 illustrates the amount of $NO_x$ captured by NaOCl based on 1 kg of 95% NO/5% $NO_2$ treated by the abatement process in the 1-Loop Process*.

TABLE 7

| Compound | Made/Used | Moles | Kg | Total (Kg) | Net Made/Used |
| --- | --- | --- | --- | --- | --- |
| NOx | Used | 31.44 | 1.00 | 0.90 | Used (CAPTURED) |
| NOx | Untreated | 3.14 | 0.10 | | Untreated |
| $NaNO_3$ | Made | 28.24 | 2.40 | 2.40 | Made |
| $NaNO_2$ | Made | 28.30 | 1.95 | 1.95 | Made |
| $H_2O$ | Used | 14.43 | 0.26 | 0 | Made |

TABLE 7-continued

| Compound | Made/Used | Moles | Kg | Total (Kg) | Net Made/Used |
| --- | --- | --- | --- | --- | --- |
| $H_2O$ | Made | 14.43 | 0.26 | | |
| HCl | Made | 28.26 | 1.03 | 1.03 | Made |
| NaOCl | Used | 28.21 | 2.10 | 2.21 | Used |
| NaOCl | Used | 1.48 | 0.11 | | |
| NaOH | Used | 28.26 | 1.13 | 1.13 | Used |

*All mass is calculated at dry weight for 100% material.

The two equations that describe the removal of NOx from exhaust gas collectively in a ratio assumed to be cumulative treats approximately 90% of the available NOx. If 99+% NOx removal is required, the NOx processes based on $ClO_2$ is required.

Table 8 illustrates the ratio of NOx, $SO_2$ and $CO_2$ in marine exhaust from a 2 cylinder engine burning HFO fuel at 100% engine capacity.

TABLE 8

| Pollutant Species Units | Emission Factors g/kWh |
|---|---|
| Nitrogen oxides (NOx) | 19.77 ± 0.28 |
| Carbon dioxide ($CO_2$) | 617 ± 11 |
| Carbon monoxide (CO) | 0.29 ± 0.02 |
| Sulfur dioxide ($SO_2$) | 11.53 ± 0.20 |
| Particulate Matter (PM) | 2.399 ± 0.052 |
| Elemental Carbon (EC) | 0.0069 ± 0.0004 |
| Organic Carbon (OC) | 0.22 ± 0.01 |
| Ash | 0.098 ± 0.002 |
| Hydrated Sulfate ($H_2SO_4$,6.5 $H_2O$) | 2.17 ± 0.19 |

Table 9 illustrates the physical characteristics of a "typical ship" used in the disclosed calculations

TABLE 9

| | |
|---|---|
| Delivery year: | 2008 |
| Car Capacity: | 6500 CEU (Car Equivalent Unit) |
| Length overall: | 199.99 m |
| Breadth: | 32.26 m |
| Draft (design): | 9 m |
| Displacement: | 32,791.6 ton (loaded at design draft) |
| Main Engine: | MAN B&W 7S60ME-C 15,820 kW |
| Speed (design): | 20 knot |

Figure 8:
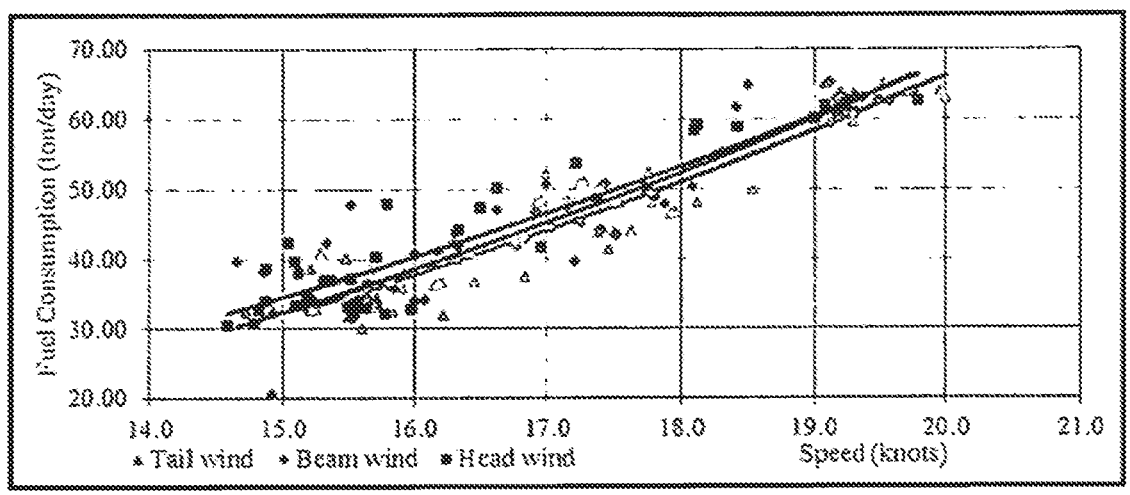
FIG. 8 illustrates and embodiment of fuel consumption from an actual vessel used at specified speeds and wind conditions.

FIG. 8 illustrates the fuel consumption from an actual vessel used at specified speeds and wind conditions.

Table 10 illustrates the typical $NO_x$, $SO_2$ and $CO_2$ emissions from fuel oil combustion in a two stroke marine engine.

TABLE 10

| Pollutant Species Units | Emission Factors g/kWh |
|---|---|
| Nitrogen oxides (NOx) | 19.77 ± 0.28 |
| Carbon dioxide ($CO_2$) | 617 ± 11 |
| Carbon monoxide (CO) | 0.29 ± 0.02 |
| Sulfur dioxide ($SO_2$) | 11.53 ± 0.20 |
| Particulate Matter (PM) | 2.399 ± 0.052 |
| Elemental Carbon (EC) | 0.0069 ± 0.0004 |
| Organic Carbon (OC) | 0.22 ± 0.01 |
| Ash | 0.098 ± 0.002 |
| Hydrated Sulfate ($H_2SO_4$,6.5 $H_2O$) | 2.17 ± 0.19 |

Table 11 illustrates the amount (kg/hour) for $NO_x$, $SO_2$ and $CO_2$ emissions from a typical ship described above.*

TABLE 11

- 312.8 Kg of NOx are made per hour
- 9750.0 Kg of $CO_2$ are made per hour
- 182.0 Kg of $SO_2$ are made per hour

*The NOx ratio of $NO/NO_2$ is defined as 95/5.

Table 12 illustrates the combined $CO_2$, $SO_2$ and NO capture based on actual ratios in 2 stroke marine combustion of HFO per hour at 100% engine capacity.*

TABLE 12

| Process Data Table | Compound | Made-Used Per Hour | Kg | Total (Kg) | Net Made/Used Per hour | Notes |
|---|---|---|---|---|---|---|
| 5 and 6 | $CO_2$ | Used | 9750 | 9750 | Used | |
| 7 | $SO_2$ | Used | 182 | 182 | Used | |
| 8 | NOx | Used | 281.52 | 312.8 | 90% Used | |
| 8 | NOx | Untreated | 31.28 | | | |
| 5 and 6 | $H_2O$ | Used | 4192.5 | 4243.46 | Used | 1 |
| 7 | $H_2O$ | Used | 50.96 | | | |
| 8 | NaOH | Used | 353.46 | 4643.46 | Used | 2 |
| 5 and 6 | NaOH | Used | 4290 | | | |
| 8 | $NaNO_2$ | Made | 609.96 | 609.96 | Made | |
| 8 | $NaNO_3$ | Made | 750.72 | 750.72 | Made | |
| 5 and 6 | $NaHCO_3$ | Made | 18622.5 | 18622.5 | Made | |
| 8 | HCl | Made | 322.18 | 322.18 | Made | |
| 7 | NaCl | Made | 165.62 | 165.62 | Made | |
| 7 | $H_2SO_4$ | Made | 278.46 | 278.46 | Made | |
| 7 | NaOCl | Used | 211.12 | 211.12 | Used | 2 |
| 5 and 6 | HOCl | Made | 0 | 487.23 | Used | 2 |
| 8 | HOCl | Used | 487.23 | | | |

1. The $H_2O$ is 90+% recycled. Makeup will come from desalinization plant.

2. The NaOH, NaOCl and HOCl are all generated from NaCl carried on ship or captured from the seawater.

Table 12 reports data used to adjust the ratios of NOx, $CO_2$ and $SO_2$ reported in the Tables to the actual chemical ratios shown for exhaust in the typical ship used in this report when operating at 100% engine capacity. However, the accumulated mass balance is hypothetical because the ratio of these compounds will vary with different fuels and engine operation.

The following data refers to the energy required in the electrochemical process necessary to generate NaOH and NaOCl and HOCl required to treat 100% of the $CO_2$, 90% of the NOx and 100% of the $SO_2$. This calculation assumes there is no $SO_2$ pre-scrubber. All of the three chemicals described above are made from NaCl carried on the ship or removed from seawater.

All other energy for recycling the chemicals through the 1-Loop Process and 2-Loop Process modules are entirely provided from the waste energy generated by the combustion source. The waste heat also contains required energy to generate the electricity necessary for pumps, mixers and other mechanical devices used in the chemical processing, but utilizing that waste heat would require additional equipment. Therefore, it is practical to use a small amount of additional fuel for the generation of this electrical energy.

The ideal energy required to generate 1 Kg of NaOH, and all required NaOCl plus HOCl from saturated NaCl solution is 0.911 kWh. If seawater is used as the source for NaCl the electrical energy consumption will be greater. Table 13 illustrates the energy in various fuel oils*.

TABLE 13

| Grade | Heating Value (Btu/US gal) | Comments |
| --- | --- | --- |
| Fuel Oil No. 1 | 132900-137000 | Small Space Heaters |
| Fuel Oil No. 2 | 137000-141800 | Residential Heating |
| Fuel Oil No. 4 | 143100-148100 | Industrial Burners |
| Fuel Oil No. 5 (Light) | 146800-150000 | Preheating in General Required |
| Fuel Oil No.5 (Heavy) | 149400-152000 | Heating Required |
| Fuel Oil No. 6 | 151300-155900 | Bunker C |

*1 kWh = 3412 BTU

Pursuant to Tables 12 and 15, only 95.77 gallons of Fuel Oil No. 5 (Heavy) are required to treat all of the $CO_2$, 90% of the $NO_x$ and all of the $SO_2$ generated per hour of 100% engine capacity by the typical ship described in Tables 10 and 11.

While the inventive features have been particularly shown and described with reference to preferred embodiments thereof, it will be understood by those in the art that the foregoing and other changes can be made therein without departing from the sprit and the scope of the disclosure. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the disclosure should not be limited by any of the above-described exemplary embodiments.

What is claimed is:

1. A method of chemically sequestering carbon dioxide ($CO_2$) by a loop sequence, comprising:
   a) providing a mixture of $CO_2$, lithium hydroxide (LiOH), either of sodium hydroxide (NaOH) or potassium hydroxide (KOH), and water ($H_2O$) in one or more reaction chambers;
   b) reacting $CO_2$ with LiOH to generate lithium carbonate ($Li_2CO_3$) and $H_2O$ in the mixture;
   c) reacting $Li_2CO_3$ with NaOH or KOH to generate LiOH, and either of sodium carbonate ($Na_2CO_3$) or potassium carbonate ($K_2CO_3$) in the mixture;
   d) reacting $Na_2CO_3$ or $K_2CO_3$ with $CO_2$ and $H_2O$ to generate either of sodium bicarbonate ($NaHCO_3$) or potassium bicarbonate ($KHCO_3$) in the mixture;
   e) adding an alcohol solvent to the mixture, forcing the generated $NaHCO_3$ or $KHCO_3$ to precipitate, and removing the precipitated $NaHCO_3$ or $KHCO_3$ from the mixture;
   f) removing the alcohol solvent from the mixture;
   g) optionally adding NaOH or KOH, and/or $H_2O$ to the mixture; and
   h) adding $CO_2$ to the mixture in the one or more reaction chambers and reacting the mixture according to step b to complete the loop sequence.

2. The method of claim 1, wherein the optionally added NaOH or KOH is produced from electrochemical decomposition of NaCl or KCl into NaOH or KOH, respectively.

3. The method of claim 1, wherein the alcohol solvent is tert-butanol or methanol.

4. The method of claim 1, wherein $CO_2$ is introduced into the one or more reaction chambers as an aqueous solution, an aqueous mist, or a gas phase.

5. The method of claim 1, wherein the LiOH, and either of NaOH or KOH are introduced into the one or more reaction chambers as an aqueous solution, an aqueous mist, or a dry powdered aerosol.

6. The method of claim 1, where $CO_2$ is provided in the one or more reaction chambers, which facilitates a regulated exposure of $CO_2$ as a gas or liquid stream to an aqueous mixture of LiOH, either of NaOH or KOH, and $H_2O$.

7. The method of claim 1, wherein the one or more reaction chambers causes an interaction between the mixture via a combination of a gas/mist interaction, a gas/liquid interaction, or a liquid/liquid interaction.

8. The method of claim 7, wherein the gas/mist interaction includes interacting $CO_2$ gas with LiOH, either of NaOH or KOH, either of $Na_2CO_3$ or $K_2CO_3$, and $H_2O$ droplets using nozzles with or without mechanical droplet shear inducing enhancements.

9. The method of claim 7, wherein the gas/liquid interaction includes interacting $CO_2$ gas with LiOH, either of NaOH or KOH, either of $Na_2CO_3$ or $K_2CO_3$, and $H_2O$ solution using a duct with static mixer, bubble chamber or counter current packed bed scrubber, impingement plate tray tower scrubber or equal.

10. The method of claim 7, wherein the liquid/liquid interaction includes interacting $CO_2$ in a solution with LiOH, either of NaOH or KOH, either of $Na_2CO_3$ or $K_2CO_3$, and $H_2O$ in the solution using a static mixer or sonic mixer or equal.

* * * * *